(12) United States Patent
Mendes et al.

(10) Patent No.: US 11,948,219 B1
(45) Date of Patent: Apr. 2, 2024

(54) DETERMINING OPT-OUT COMPLIANCE TO PREVENT FRAUD RISK FROM USER DATA EXPOSURE

(71) Applicant: PrivacyHawk, Inc, Los Angeles, CA (US)

(72) Inventors: Aaron Mendes, San Diego, CA (US); Justin Wright, Los Angeles, CA (US)

(73) Assignee: PrivacyHawk, Inc., Los Angeles, CA (US)

( * ) Notice: Subject to any disclaimer, the term of this patent is extended or adjusted under 35 U.S.C. 154(b) by 0 days.

(21) Appl. No.: 18/342,384

(22) Filed: Jun. 27, 2023

(51) Int. Cl.
| | |
|---|---|
| *G06Q 10/10* | (2023.01) |
| *G06F 18/25* | (2023.01) |
| *G06Q 10/06* | (2023.01) |
| *G06Q 30/02* | (2023.01) |
| *G06Q 30/06* | (2023.01) |
| *G06Q 50/26* | (2012.01) |

(52) U.S. Cl.
CPC .......... *G06Q 50/265* (2013.01); *G06F 18/25* (2023.01)

(58) Field of Classification Search
CPC .............................. G06Q 50/265; G06F 18/25
USPC .................................................. 705/1.1–912
See application file for complete search history.

(56) References Cited

U.S. PATENT DOCUMENTS

| | | | | |
|---|---|---|---|---|
| 2015/0381533 | A1* | 12/2015 | Klemm | .................. H04L 51/02 709/206 |
| 2018/0314761 | A1* | 11/2018 | Lewin-Eytan | ...... G06F 16/9535 |
| 2018/0329940 | A1* | 11/2018 | Tiku | ........................ G06F 9/546 |
| 2020/0302087 | A1* | 9/2020 | Parkinson | ............. H04W 12/02 |

\* cited by examiner

*Primary Examiner* — Jonathan P Ouellette
(74) *Attorney, Agent, or Firm* — Muncy, Geissler, Olds & Lowe, P.C.

(57) ABSTRACT

Disclosed are techniques for determining opt-out compliance to prevent user data exploitation. In an aspect, a user device scans an email account of a user of the user device to identify a list of commercial email domains from which the email account has received one or more emails, transmits an opt-out request to a commercial email domain on the list of commercial email domains, receives an opt-out response from the commercial entity, wherein the opt-out response comprises an email or a webform containing natural language text indicating a response to the opt-out request, applies a machine learning model to the opt-out response to classify, based on the natural language text indicating the response to the opt-out request, a type of the opt-out response as one of a plurality of types of opt-out responses, and displays a notification indicating the type of the opt-out response determined by the machine learning model.

18 Claims, 9 Drawing Sheets

DETERMINING OPT-OUT COMPLIANCE TO PREVENT FRAUD RISK FROM USER DATA EXPOSURE

BACKGROUND OF THE DISCLOSURE

1. Field of the Disclosure

Aspects of the disclosure relate generally to ensuring the privacy of a user's personal information, and more specifically, to transmitting opt-out requests to entities that may otherwise expose a user's personal information to data breach or fraud risk.

2. Description of the Related Art

With the ever-increasing use of the internet to interact with customers and/or clients, businesses are collecting and storing more personal information about their customers and clients than ever before. Many of these businesses then share, sell, or otherwise expose that personal information without their customers' and/or clients' knowledge. Additionally, even well-meaning businesses can suffer a data breach, exposing sensitive personal information of their customers to hackers and cybercriminals. While new laws have been enacted to help prevent these problems, or at least to allow their customers and/or clients to opt-out from such collection, sharing, and exposure, it is nearly impossible for customers and clients to take advantage of their privacy rights due to complicated opt-out processes and the sheer number of companies exploiting their personal information. Even where a customer or client does submit an opt-out request to a company, it may not be clear whether that opt-out was successful, given that opt-out procedures and opt-out confirmations can vary dramatically from company to company.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method performed by a processing system of a user device includes scanning an email account of a user of the user device to identify a list of commercial email domains from which the email account has received one or more emails; transmitting, via a communication interface of the user device, an opt-out request to a commercial email domain on the list of commercial email domains, wherein the opt-out request comprises an email composed by the processing system or a webform populated by the processing system requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof; receiving, via the communication interface, an opt-out response from the commercial entity, wherein the opt-out response comprises an email or a webform containing natural language text indicating a response to the opt-out request; applying a machine logic module to the opt-out response to classify, based on the natural language text indicating the response to the opt-out request, a type of the opt-out response as one of a plurality of types of opt-out responses; and displaying, via a user interface of the user device, a notification indicating the type of the opt-out response determined by the machine logic module.

In an aspect, a method performed by a processing system of a user device includes scanning an email account of a user of the user device to identify a list of commercial email domains from which the email account has received one or more emails; applying a machine logic module to the list of commercial email domains and user behavior profiles of the user associated with the list of commercial email domains to determine a subset of the list of commercial email domains to recommend for opt-out requests; displaying, on a user interface of the user device, the subset of the list of commercial email domains; receiving, via the user interface, a selection of a commercial email domain from the subset of the list of commercial email domains; and transmitting, via a communication interface of the user device, an opt-out request to the commercial email domain, wherein the opt-out request comprises an email composed by the processing system or a webform populated by the processing system requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof.

In an aspect, a method performed by a processing system of a user device includes scanning an email account of a user of the user device to identify a list of commercial email domains from which the email account has received one or more emails; applying a first machine logic module to the list of commercial email domains and user behavior profiles of the user associated with the list of commercial email domains to determine a subset of the list of commercial email domains to recommend for opt-out requests; displaying, on a user interface of the user device, the subset of the list of commercial email domains; receiving, via the user interface, a selection of a commercial email domain from the subset of the list of commercial email domains; transmitting, via a communication interface of the user device, an opt-out request to the commercial email domain, wherein the opt-out request comprises an email composed by the processing system or a webform populated by the processing system requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof; receiving, via the communication interface, an opt-out response from the commercial entity, wherein the opt-out response comprises an email or a webform containing natural language text indicating a response to the opt-out request; applying a second machine logic module to the opt-out response to classify, based on the natural language text indicating the response to the opt-out request, a type of the opt-out response as one of a plurality of types of opt-out responses; and displaying, via the user interface, a notification indicating the type of the opt-out response determined by the second machine logic module.

In an aspect, an apparatus includes one or more memories; one or more transceivers; and one or more processors communicatively coupled to the one or more memories and the one or more transceivers, the one or more processors, either alone or in combination, configured to: scan an email account of a user of the user device to identify a list of commercial email domains from which the email account has received one or more emails; transmit, via the one or more transceivers, an opt-out request to a commercial email domain on the list of commercial email domains, wherein the opt-out request comprises an email composed by the one or more processors or a webform populated by the one or more processors requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof; receive, via the one or more transceivers, an opt-out response from the commercial entity, wherein the opt-out response comprises an email or a webform containing natural language text indicating a response to the opt-out request; apply a machine logic module to the opt-out response to classify, based on the natural language text indicating the response to the opt-out request, a type of the opt-out response as one of a plurality of types of opt-out responses; and display, via a user interface of the user device, a notification indicating the type of the opt-out response determined by the machine logic module.

In an aspect, an apparatus includes one or more memories; one or more transceivers; and one or more processors communicatively coupled to the one or more memories and the one or more transceivers, the one or more processors, either alone or in combination, configured to: scan an email account of a user of the user device to identify a list of commercial email domains from which the email account has received one or more emails; apply a machine logic module to the list of commercial email domains and user behavior profiles of the user associated with the list of commercial email domains to determine a subset of the list of commercial email domains to recommend for opt-out requests; display, on a user interface of the user device, the subset of the list of commercial email domains; receive, via the one or more transceivers, via the user interface, a selection of a commercial email domain from the subset of the list of commercial email domains; and transmit, via the one or more transceivers, an opt-out request to the commercial email domain, wherein the opt-out request comprises an email composed by the one or more processors or a webform populated by the one or more processors requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof.

In an aspect, an apparatus includes one or more memories; one or more transceivers; and one or more processors communicatively coupled to the one or more memories and the one or more transceivers, the one or more processors, either alone or in combination, configured to: scan an email account of a user of the user device to identify a list of commercial email domains from which the email account has received one or more emails; apply a first machine logic module to the list of commercial email domains and user behavior profiles of the user associated with the list of commercial email domains to determine a subset of the list of commercial email domains to recommend for opt-out requests; display, on a user interface of the user device, the subset of the list of commercial email domains; receive, via the one or more transceivers, via the user interface, a selection of a commercial email domain from the subset of the list of commercial email domains; transmit, via the one or more transceivers, an opt-out request to the commercial email domain, wherein the opt-out request comprises an email composed by the one or more processors or a webform populated by the one or more processors requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof; receive, via the one or more transceivers, an opt-out response from the commercial entity, wherein the opt-out response comprises an email or a webform containing natural language text indicating a response to the opt-out request; apply a second machine logic module to the opt-out response to classify, based on the natural language text indicating the response to the opt-out request, a type of the opt-out response as one of a plurality of types of opt-out responses; and display, via the user interface, a notification indicating the type of the opt-out response determined by the second machine logic module.

In an aspect, an apparatus includes means for scanning an email account of a user of the user device to identify a list of commercial email domains from which the email account has received one or more emails; means for transmitting, via a communication interface of the user device, an opt-out request to a commercial email domain on the list of commercial email domains, wherein the opt-out request comprises an email composed by the apparatus or a webform populated by the apparatus requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof; means for receiving, via the communication interface, an opt-out response from the commercial entity, wherein the opt-out response comprises an email or a webform containing natural language text indicating a response to the opt-out request; means for applying a machine logic module to the opt-out response to classify, based on the natural language text indicating the response to the opt-out request, a type of the opt-out response as one of a plurality of types of opt-out responses; and means for displaying, via a user interface of the user device, a notification indicating the type of the opt-out response determined by the machine logic module.

In an aspect, an apparatus includes means for scanning an email account of a user of the user device to identify a list of commercial email domains from which the email account has received one or more emails; means for applying a machine logic module to the list of commercial email domains and user behavior profiles of the user associated with the list of commercial email domains to determine a subset of the list of commercial email domains to recommend for opt-out requests; means for displaying, on a user interface of the user device, the subset of the list of commercial email domains; means for receiving, via the user interface, a selection of a commercial email domain from the subset of the list of commercial email domains; and means for transmitting, via a communication interface of the user device, an opt-out request to the commercial email domain, wherein the opt-out request comprises an email composed by the apparatus or a webform populated by the apparatus requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof.

In an aspect, an apparatus includes means for scanning an email account of a user of the user device to identify a list of commercial email domains from which the email account has received one or more emails; means for applying a first machine logic module to the list of commercial email domains and user behavior profiles of the user associated with the list of commercial email domains to determine a subset of the list of commercial email domains to recommend for opt-out requests; means for displaying, on a user interface of the user device, the subset of the list of commercial email domains; means for receiving, via the user interface, a selection of a commercial email domain from the subset of the list of commercial email domains; means for transmitting, via a communication interface of the user device, an opt-out request to the commercial email domain, wherein the opt-out request comprises an email composed by the apparatus or a webform populated by the apparatus requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof; means for receiving, via the communication interface, an opt-out response from the commercial entity, wherein the opt-out response comprises an email or a webform containing natural language text indicating a response to the opt-out request; means for applying a second machine logic module to the opt-out response to classify, based on the natural language text indicating the response to the opt-out request, a type of the opt-out response as one of a plurality of types of opt-out responses; and means for displaying, via the user interface, a notification indicating the type of the opt-out response determined by the second machine logic module.

In an aspect, a non-transitory computer-readable medium stores computer-executable instructions that, when executed by a processing system of a user device, cause the processing system to: scan an email account of a user of the user device to identify a list of commercial email domains from which the email account has received one or more emails; transmit, via a communication interface of the user device, an opt-out request to a commercial email domain on the list of commercial email domains, wherein the opt-out request comprises an email composed by the processing system or a webform populated by the processing system requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof; receive, via the communication interface, an opt-out response from the commercial entity, wherein the opt-out response comprises an email or a webform containing natural language text indicating a response to the opt-out request; apply a machine logic module to the opt-out response to classify, based on the natural language text indicating the response to the opt-out request, a type of the opt-out response as one of a plurality of types of opt-out responses; and display, via a user interface of the user device, a notification indicating the type of the opt-out response determined by the machine logic module.

In an aspect, a non-transitory computer-readable medium stores computer-executable instructions that, when executed by a processing system of a user device, cause the processing system to: scan an email account of a user of the user device to identify a list of commercial email domains from which the email account has received one or more emails; apply a machine logic module to the list of commercial email domains and user behavior profiles of the user associated with the list of commercial email domains to determine a subset of the list of commercial email domains to recommend for opt-out requests; display, on a user interface of the user device, the subset of the list of commercial email domains; receive, via the user interface, a selection of a commercial email domain from the subset of the list of commercial email domains; and transmit, via a communication interface of the user device, an opt-out request to the commercial email domain, wherein the opt-out request comprises an email composed by the processing system or a webform populated by the processing system requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof.

In an aspect, a non-transitory computer-readable medium stores computer-executable instructions that, when executed by a processing system of a user device, cause the processing system to: scan an email account of a user of the user device to identify a list of commercial email domains from which the email account has received one or more emails; apply a first machine logic module to the list of commercial email domains and user behavior profiles of the user associated with the list of commercial email domains to determine a subset of the list of commercial email domains to recommend for opt-out requests; display, on a user interface of the user device, the subset of the list of commercial email domains; receive, via the user interface, a selection of a commercial email domain from the subset of the list of commercial email domains; transmit, via a communication interface of the user device, an opt-out request to the commercial email domain, wherein the opt-out request comprises an email composed by the processing system or a webform populated by the processing system requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof; receive, via the communication interface, an opt-out response from the commercial entity, wherein the opt-out response comprises an email or a webform containing natural language text indicating a response to the opt-out request; apply a second machine logic module to the opt-out response to classify, based on the natural language text indicating the response to the opt-out request, a type of the opt-out response as one of a plurality of types of opt-out responses; and display, via the user interface, a notification indicating the type of the opt-out response determined by the second machine logic module.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
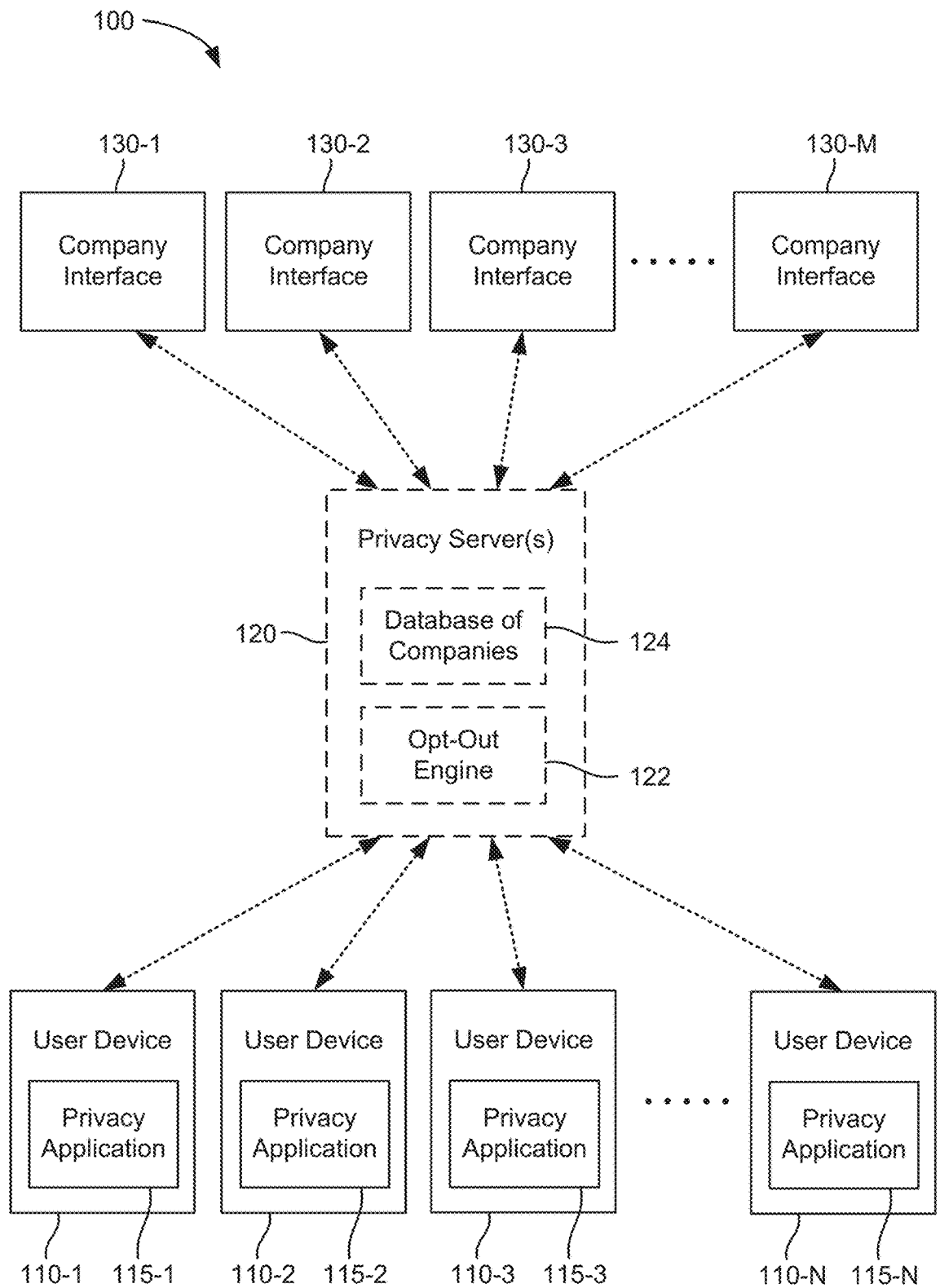
FIG. 1 illustrates an example system for implementing the opt-out techniques described herein.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs), digital signal processors (DSPs), microprocessors, etc.), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As noted above, with the ever-increasing use of the internet to interact with customers and/or clients, businesses are collecting and storing more personal information about their customers and clients than ever before. Many of these businesses then share, sell, or otherwise exploit that personal information without their customers' and/or clients' knowledge. Additionally, even well-meaning companies may fall victim to a data breach in which sensitive personal information of their customers is leaked to hackers and scammers who can use that data to commit fraud, such as identity theft and phishing scams. While new laws have been enacted to help individuals remove these vulnerabilities, or at least to allow their customers and/or clients to opt-out from such collection, sharing, and exposure, it is nearly impossible for customers and clients to take advantage of their privacy rights due to complicated opt-out processes and the sheer number of companies exposing and exploiting their personal information. Even where a customer or client does submit an opt-out request to a company, it may not be clear whether that opt-out was successful, given that opt-out procedures and opt-out confirmations can vary dramatically from company to company.

Accordingly, the present disclosure provides techniques to determine a company's compliance with a user's opt-out request (i.e., whether the opt-out was successful) to prevent user data exploitation. There are two types of companies that may store a user's personal information: (1) "data harvesters," such as data brokers and marketing companies, and (2) "direct companies," which are companies with which the user has a direct relationship, such as retailers from which the user has purchased a product. The disclosed techniques focus on the personal information (referred to as "first party data") stored and shared by direct companies.

The techniques of the present disclosure will be described with reference to FIGS. 1 and 2. Specifically, FIG. 1 illustrates an example system 100 for implementing the opt-out techniques described herein, and FIG. 2 illustrates an example signaling flow 200 for the opt-out techniques described herein.

Figure 2:
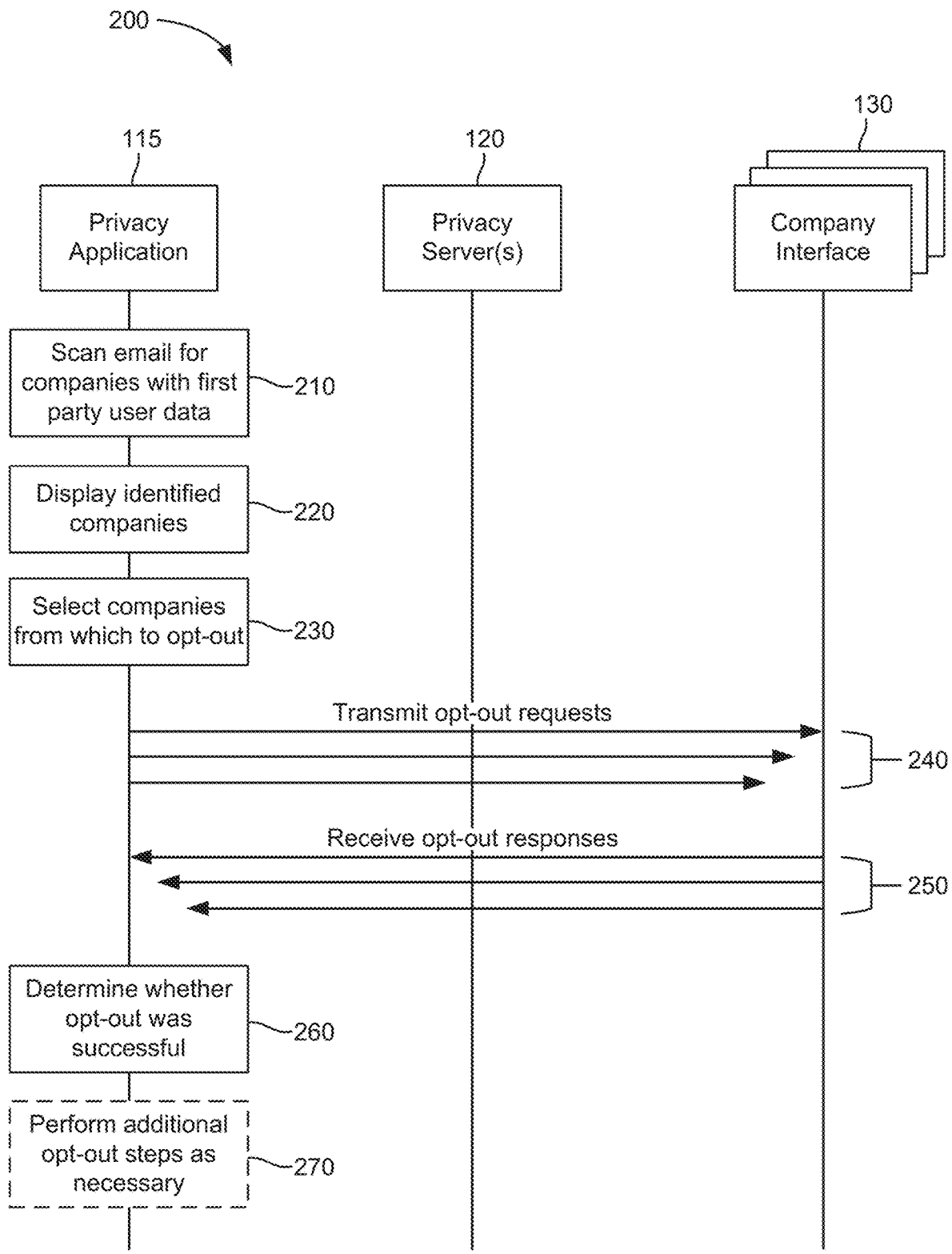
FIG. 2 illustrates an example signaling flow for the opt-out techniques described herein.

As shown in FIG. 1, a plurality of N user devices 110 (illustrated as user devices 110-1, 110-2, 110-3, . . . 110-N) each have a privacy application 115 installed thereon (illustrated as privacy applications 115-1, 115-2, 115-3, . . . 115-N). A user device 110 may be a smartphone, a tablet computer, a laptop computer, a desktop computer, or the like. The N user devices 110 may optionally be in communication with a privacy server 120 (or a group of distributed privacy servers 120). The privacy server(s) 120 implement an opt-out engine 122 and store a database of companies 124. The privacy server 120 is in communication with a plurality of M companies that may store users' first party data. More specifically, the privacy server 120 may be in communication with the companies' interfaces, which may be the companies' Internet or other network interface (e.g., website, webserver, etc.).

Most of the direct companies (and organizations) with a user's first party data are likely to be found in the user's email. Thus, at stage 210 of FIG. 2, a privacy application 115 (optionally in communication with the opt-out engine 122) installed on a user device 110 scans the user's email for companies that are likely to have the user's first party data. In some cases, this may be all the commercial email accounts/domains from which the user has ever received email. In some cases, this may be all the sender email accounts/domains that match a company in the database of companies 124. In this case, the privacy application 115 may securely provide a list of all commercial email accounts/domains found in the user's email to the opt-out engine 122, which may in turn compare that list to the database of companies 124. The opt-out engine 122 may then return to the privacy application 115 a list of companies in the database of companies 124 that match the list of commercial email accounts/domains received from the privacy application 115.

Based on the user's privacy preferences with respect to the user device 110 and/or email application, the user may need to grant the privacy application 115 permission to access the user's email application. In some cases, the user's email (or at least a portion of the user's email) may not be stored locally on the user device 110, but rather, on one or more remote email servers (not shown in FIG. 1 or 2). In those cases, the privacy application 115 may securely connect with the remote email server(s) to access the user's email.

Once the user's email has been scanned, at stage 220, the privacy application 115 displays a list of the identified companies to the user via the user interface of the user device 110. The privacy application 115 may display a select button by each entry in the list of companies and/or commercial email accounts identified at stage 210 to allow the user to select the corresponding company. The privacy application 115 may also recommend which companies to select. For example, the privacy application 115 may display a list of "Recommended" companies or highlight recommended companies within the list of identified companies. The recommendations may be based on information from the privacy server(s) 120.

At stage 230, the privacy application 115 selects the companies to which to send opt-out requests. The selection may be based on user input. For example, the user may select to opt-out of all identified companies, only recommended companies, only companies of a certain type (e.g., retailers, political organizations, etc.), or the like. The user may further indicate the type of opt-out desired, such as having all their first party data deleted, opting out of having their first party data shared with affiliates or other third parties, unsubscribing from promotional/marketing emails (often referred to as "spam"), requesting a copy of the data that the entity holds about the user ("right to know request"), or the like. Alternatively, the selection and type of opt-out may be selected automatically. For example, when initiating the email scan at stage 210, the user may set a preference to opt-out from allowing any company to share the user's personal information.

At stage 240, the privacy application 115 transmits opt-out requests to the selected companies (optionally via the privacy server 120/opt-out engine 122). Some companies handle opt-out requests by email (i.e., a user is expected to compose and send an opt-out request to the company by email) and other companies handle opt-out requests by webform (i.e., the user is expected to fill out an online form requesting the opt-out). An opt-out request is generally more effective if it comes directly from the user. Accordingly, for email-based opt-out requests, the privacy application 115 composes and sends emails requesting the types of opt-outs for the respective companies from the user's email account. For webform-based opt-outs, the privacy application 115 fills out and submits the applicable webform using any user data required by the webform (e.g., name, address, email, etc.).

At stage 250, the privacy application 115 receives responses to the opt-out requests sent at stage 240 (optionally via the privacy server 120/opt-out engine 122). The responses may be received immediately on submission of the opt-out request (which may occur in the case of a webform request) or at some later time (e.g., after the company has manually processed the opt-out request email or webform). The responses may indicate that the opt-out was successful (e.g., the company deleted and/or will not share/sell the user's personal information), that additional information or steps are necessary, that the user's data was not found (and therefore cannot be deleted), etc. If the opt-out response is not received immediately, the response will likely be received as an email at some later time.

At stage 260, based on the responses from the companies received at stage 250, the privacy application 115 determines whether the respective opt-out requests were successful or if more information/steps are needed. As will be discussed further below, the privacy application 115 (optionally in communication with the opt-out engine 122) may use machine learning techniques to make this determination. In the case of a successful opt-out, the privacy application 115 may add that company to a list of successful opt-outs that may be displayed to the user on the user interface of the user device 110.

In the case that more information/steps are necessary to complete the opt-out, at stage 270, the privacy application 115 may determine what the information/steps are (e.g., using machine learning and/or natural language parsing) and perform them if possible. If not, the privacy application 115 notifies the user that there is additional information or additional steps needed to complete the opt-out. The user may then perform those steps or provide that information manually.

Note that a user may have multiple email accounts. As such, the procedure illustrated in FIG. 2 may be repeated for as many different email accounts the user wishes to process.

As will be appreciated, while FIGS. 1 and 2 illustrate one or more privacy servers 120, as will be appreciated, the techniques described herein may be performed entirely by the privacy application 115 locally on the user device 110. For example, the privacy application 115 may display all companies identified within the user's email at stage 220, rather than comparing those companies to the database of companies 124 stored at the privacy server 120 at stage 210. Or the database of companies 124 may be stored locally on the user device 110.

Alternatively, the privacy application 115 may simply be a communication gateway between the user device 110 (specifically the user's email application) and the opt-out engine 122, and the opt-out engine 122 may perform the substantive operations illustrated in FIG. 2. For example, at stage 210, the privacy application 115 may scan the user device 110 for any locally stored emails and send a list of identified commercial domains to the opt-out engine 122. The opt-out engine 122 may scan the user's emails stored on one or more remote email servers and compile a list of identified companies based on the list received from the privacy application 115 (if any) and its own scan. At stage 220, the opt-out engine 122 may provide the list of identified companies to the privacy application 115, which may then display the list on the user interface of the user device 110.

Similarly, at stage 230, the privacy application 115 may provide the user selections to the opt-out engine 122, which may then send the opt-out requests to the companies at stage 240 and receive the responses at stage 250. The opt-out engine 122 may further perform stages 260 and 270.

As yet another alternative, the privacy application 115 may not be necessary at all, and the user may access the opt-out engine 122 via an Internet browser rather than the privacy application 115. In this case, the opt-out engine 122 would perform the operations illustrated in FIG. 2 and interact with the user of the user device 110 as needed (e.g., at stages 220 and 230) via the Internet browser (e.g., an online webform).

Referring to stage 260 in greater detail, machine learning may be used to generate models that may be used to facilitate various aspects associated with processing of data. One specific application of machine learning relates to natural language processing (NLP). NLP is a branch of artificial intelligence concerned with giving computers the ability to understand text (and spoken words) in much the same way human beings can. NLP combines computational linguistics (rule-based modeling of human language) with statistical models, machine learning models, and deep learning models. Together, these technologies enable computers to process human language in the form of text or voice data and to "understand" its full meaning, including the writer or speaker's intent and sentiment.

As noted above, the types of opt-out procedures (e.g., email-based, webform-based) and the language of opt-out responses (e.g., successful, more steps needed, user data not found, etc.) can vary dramatically from company to company. While there are techniques to automate the task of sending opt-out requests, there is minimal, if any, automation of classifying the different types of opt-out responses. Rather, a user must manually review each opt-out response to determine if the opt-out was successful or if more information or steps are needed. Given that a single user may receive opt-out responses from hundreds, and possibly thousands, of companies, this is a significant burden to the user and a significant gap in the service provided by such an opt-out service provider. Applying machine learning to opt-out responses can allow these responses to be properly classified without user interaction, thereby dramatically improving the performance of the privacy application and the corresponding opt-out service.

Machine learning models are generally categorized as either supervised or unsupervised. A supervised model may further be sub-categorized as either a regression or classification model. Supervised learning involves learning a function that maps an input to an output based on example input-output pairs. For example, given a training dataset with two variables of age (input) and height (output), a supervised learning model could be generated to predict the height of a person based on their age. In regression models, the output is continuous. One example of a regression model is a linear regression, which simply attempts to find a line that best fits the data. Extensions of linear regression include multiple linear regression (e.g., finding a plane of best fit) and polynomial regression (e.g., finding a curve of best fit).

Another example of a machine learning model is a decision tree model. In a decision tree model, a tree structure is defined with a plurality of nodes. Decisions are used to move from a root node at the top of the decision tree to a leaf node at the bottom of the decision tree (i.e., a node with no further child nodes). Generally, a higher number of nodes in the decision tree model is correlated with higher decision accuracy.

Another example of a machine learning model is a decision forest. Random forests are an ensemble learning technique that builds off of decision trees. Random forests involve creating multiple decision trees using bootstrapped datasets of the original data and randomly selecting a subset of variables at each step of the decision tree. The model then selects the mode of all of the predictions of each decision tree. By relying on a "majority wins" model, the risk of error from an individual tree is reduced.

Another example of a machine learning model is a neural network (NN). A neural network is essentially a network of mathematical equations. Neural networks accept one or more input variables, and by going through a network of equations, result in one or more output variables. Put another way, a neural network takes in a vector of inputs and returns a vector of outputs.

Figure 3:
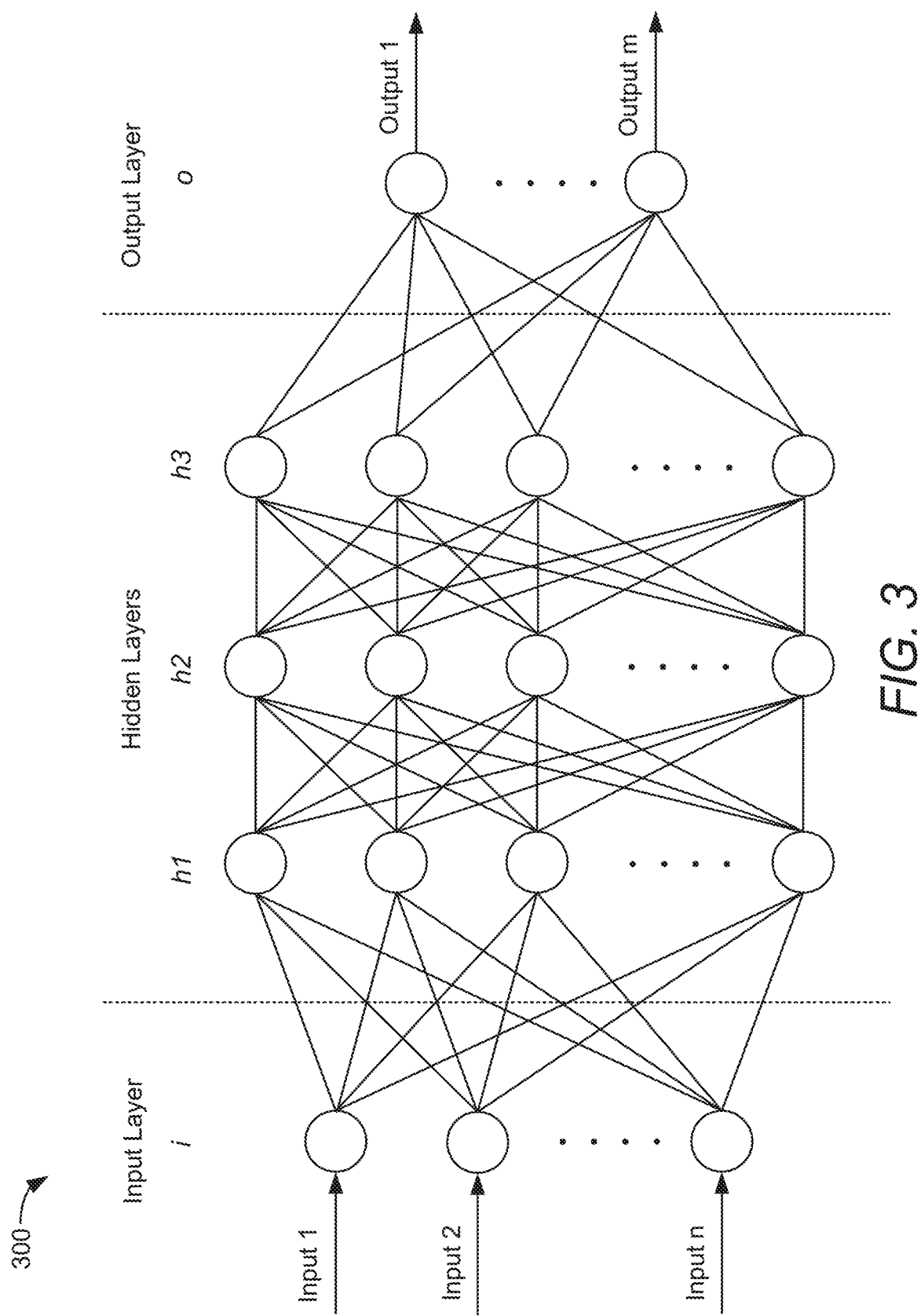
FIG. 3 illustrates an example neural network, according to aspects of the disclosure.

FIG. 3 illustrates an example neural network 300, according to aspects of the disclosure. The neural network 300 includes an input layer T that receives 'n' (one or more) inputs (illustrated as "Input 1," "Input 2," and "Input n"), one or more hidden layers (illustrated as hidden layers 'h1,' 'h2,' and 'h3') for processing the inputs from the input layer, and an output layer 'o' that provides 'm' (one or more) outputs (labeled "Output l" and "Output m"). The number of inputs 'n,' hidden layers 'h,' and outputs 'm' may be the same or different. In some designs, the hidden layers 'h' may include linear function(s) and/or activation function(s) that the nodes (illustrated as circles) of each successive hidden layer process from the nodes of the previous hidden layer.

In classification models, the output is discrete. One example of a classification model is logistic regression. Logistic regression is similar to linear regression but is used to model the probability of a finite number of outcomes, typically two. In essence, a logistic equation is created in such a way that the output values can only be between '0' and '1.' Another example of a classification model is a support vector machine. For example, for two classes of data, a support vector machine will find a hyperplane or a boundary between the two classes of data that maximizes the margin between the two classes. There are many planes that can separate the two classes, but only one plane can maximize the margin or distance between the classes. Another example of a classification model is Naïve Bayes, which is based on Bayes Theorem. Other examples of classification models include decision tree, random forest, and neural network, similar to the examples described above except that the output is discrete rather than continuous.

Unlike supervised learning, unsupervised learning is used to draw inferences and find patterns from input data without references to labeled outcomes. Two examples of unsupervised learning models include clustering and dimensionality reduction.

Clustering is an unsupervised technique that involves the grouping, or clustering, of data points. Clustering is frequently used for customer segmentation, fraud detection, and document classification. Common clustering techniques include k-means clustering, hierarchical clustering, mean shift clustering, and density-based clustering. Dimensionality reduction is the process of reducing the number of random variables under consideration by obtaining a set of principal variables. In simpler terms, dimensionality reduction is the process of reducing the dimension of a feature set (in even simpler terms, reducing the number of features). Most dimensionality reduction techniques can be categorized as either feature elimination or feature extraction. One example of dimensionality reduction is called principal component analysis (PCA). In the simplest sense, PCA involves project higher dimensional data (e.g., three dimensions) to a smaller space (e.g., two dimensions). This results in a lower dimension of data (e.g., two dimensions instead of three dimensions) while keeping all original variables in the model.

Regardless of which machine learning model is used, at a high-level, a machine learning model (e.g., implemented by the privacy application 115 and/or the opt-out engine 122) may be configured to iteratively analyze training input data (e.g., human-classified full-text opt-out responses) and to associate this training input data with an output data set (e.g., the type of response, such as opt-out successful/complete, more steps needed, more information needed, user data not found, etc.), thereby enabling later determination (e.g., at stage 260 of FIG. 2) of the same output data set when presented with similar input data (e.g., opt-out responses received at stage 250).

Figure 4:
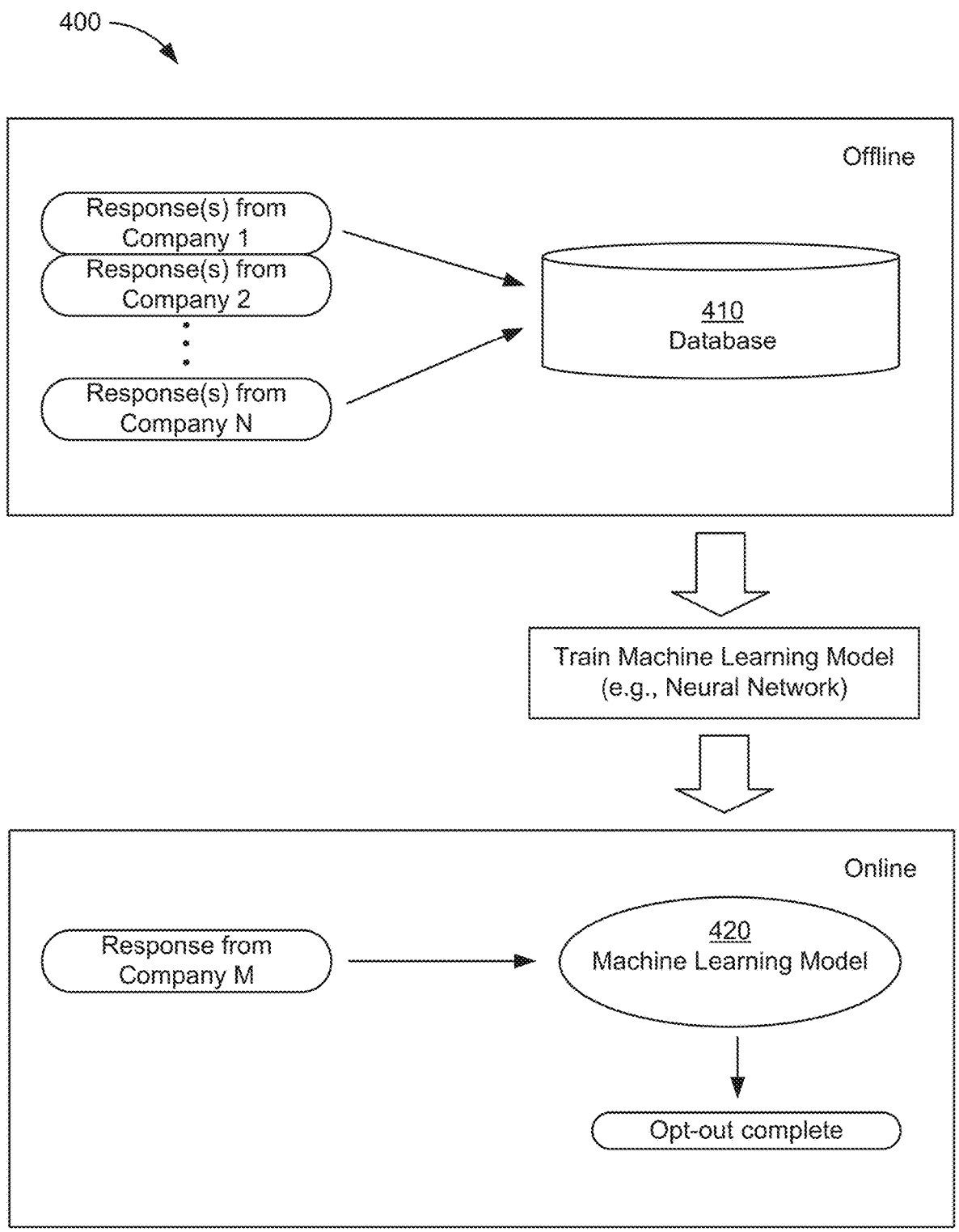
FIG. 4 is a diagram illustrating the use of a machine learning model to classify opt-out responses, according to aspects of the disclosure.

FIG. 4 is a diagram 400 illustrating the use of a machine learning model to classify opt-out responses, according to aspects of the disclosure. In the example of FIG. 4, during an "offline" stage, full-text natural language opt-out responses are stored in a database 410. More specifically, the database 410 may store thousands of full-text natural language opt-out responses from tens to thousands of companies and organizations (illustrated as Companies 1 to N in FIG. 4) that have been manually classified/labelled as particular types of opt-out responses (e.g., opt-out successful, user data successfully deleted, more user information needed, more steps needed, user data not found, etc.). The database 410 may be located, for example, at the privacy server 120 or a third-party server (e.g., a server for the vendor of the machine learning model 420).

Based on the information captured during the offline stage, a machine learning model 420 (e.g., neural network 300 of FIG. 3) is trained to classify unclassified opt-out responses (e.g., as received at stage 250 of FIG. 2) to determine the types of opt-out responses (e.g., as at stage 260 of FIG. 2). More specifically, a training set of classified opt-out responses is used as the input (i.e., features) to the machine learning model 420 and the known classification types of the opt-out responses are used as the reference outputs (i.e., labels). The machine learning model 420 may be, for example, a natural language processing (NLP) machine learning model that uses language rules and natural language and contextual artificial intelligence algorithms to classify natural language text.

More specifically, human language is filled with ambiguities that make it very difficult for a computer to accurately determine the intended meaning of text or spoken words. For example, homonyms, homophones, sarcasm, idioms, metaphors, grammar and usage exceptions, and variations in sentence structure are irregularities of human language that programmers must teach natural language-driven applications to recognize and understand accurately for those applications to be useful. To this end, there are different tasks that help the computer "understand" what it's ingesting, such as part of speech tagging/grammatical tagging (determining the part of speech of a particular word or piece of text based on its use and context), word sense disambiguation (selecting the meaning of a word having multiple meanings based on semantic analysis to determine the meaning that makes the most sense in context), named entity recognition (identifying words or phrases as useful entities, such as locations or human names), co-reference resolution (identifying if and when two words refer to the same entity), sentiment analysis (extracting subjective qualities, such as attitudes, emotions, sarcasm, confusion, suspicion, etc., from text), and so on.

After training, the machine learning model 420 will be a large language machine learning model that can be used to classify any opt-out response (whether email-based or web-form-based). More specifically, during an "online" stage (e.g., stage 260 of FIG. 2), the trained machine learning model 420 can be used to classify (infer) the type of opt-out response received from a company "M," as at, for example, stage 250 of FIG. 2. The machine learning model 420 may classify an opt-out response according to a probability that the opt-out response is a particular type of response (e.g., opt-out successful/complete, user data successfully deleted, user data will not be shared, more user information needed, more steps needed, user data not found, etc.).

The machine learning model 420 may be trained at the privacy server 120 (e.g., the opt-out engine 122) or a third-party server (e.g., a server for the vendor of the machine learning model 420). The machine learning model 420 may be implemented by the privacy application 115, the opt-out engine 122, or a third-party server (e.g., a server for the vendor of the machine learning model 420).

Referring back to FIGS. 1 and 2, at stages 260 and optionally 270, in the case of a successful opt-out response (e.g., user data deleted, company will not share user data, etc.), as determined by the machine learning model 420, the privacy application 115 will mark the opt-out request as complete. In the case that more information is needed or more steps are necessary, as determined by the machine learning model 420, the privacy application 115 may notify the user to enable the user to complete the opt-out process. If the opt-out response indicates that the user needs to fill out a form, again as determined by the machine learning model 420, the privacy application 115 may be able to fill out the form for the user. In some cases, the machine learning model 420 may determine that the type of opt-out response is that the user's data was not found and therefore cannot be deleted. In that case, the privacy application 115 may mark the opt-out as complete and/or notify the user.

Note that the machine learning model 420 may be further trained over time. That is, as more opt-out responses are received, the machine learning model 420 can be further trained based on those responses, thereby further improving the model over time.

With continued reference to stage 260 of FIG. 2, instead of using a specifically trained machine learning model, as in the example of FIG. 4, a natural language general artificial intelligence program could be used instead. For example, general artificial intelligence programs, such as generative pre-trained transformer (GPT) models, are being developed and commercialized. These general artificial intelligence programs have been trained to understand natural language and provide text outputs in response to their inputs. Referring to GPT models specifically, the input to a GPT model is referred to as a "prompt," and designing a prompt is essentially how a GPT model is programmed. A prompt, therefore, usually provides instructions and/or examples of how to successfully complete the task. GPT models can be used for a large variety of tasks, such as content or code generation, summarization, conversation, and creative writing.

Thus, in this case, instead of the machine learning model being trained on a specific data set of opt-out responses, as in the example of FIG. 4, the machine learning model may be a general artificial intelligence model, such as a GPT model. The input, or prompt, to the general artificial intelligence model would be a query as to whether a given response to an opt-out request indicates that the opt-out was successful or not. The input, or prompt, may alternatively or additionally be to classify the type of the response. In this case, the input/prompt may indicate the potential classifications, such as opt-out successful, user data successfully deleted, more user information needed, more steps needed, user data not found, etc.

As another example of performing the determination at stage 260, instead of a machine learning model (whether a specifically trained model or a general artificial intelligence model), a specific algorithm could be used to determine whether an opt-out was successful and optionally to classify the type of opt-out response. For example, for classifying opt-out responses, a keyword-based classification algorithm could use n-grams (e.g., 2-gram, 3-gram, 4-gram) of keywords and/or phrases that are known to be positive or negative responses, or certain types of responses, from a company. These n-grams of keywords may be stored in a database and associated with a corresponding type of opt-out response. For example, the 2-gram of the keywords "successfully processed" and the 3-gram of the keywords "completed your request" may indicate that the opt-out was successful. As another example, the 2-gram of the keywords "not found" may indicate that the user's data was not found, while the 2-gram of the keywords "more information" may indicate that more information is needed from the user.

The following table provides example pseudocode for an example keyword-based classification algorithm.

TABLE 1

Get emailText;
Parse text into 2, 3, and/or 4 grams;
Look for matches of the parsed 2, 3, and/or 4 grams in a database of 2, 3, and/or 4 grams and associated opt-out response type;
If match, take appropriate action (e.g., move to "completed" folder or "more action needed" folder);
If no match, leave in processing.

Referring back to stage 220 in greater detail, the privacy application 115 may recommend which companies to select based on machine learning. More specifically, a machine learning model may be used to recommend to which companies the user will likely want to send opt-out requests based on crowdsourced information and the user's own behavior. Providing recommendations of the companies to which to send opt-out requests can dramatically streamline the process of transmitting opt-out requests, as there may be hundreds to thousands of commercial email domains identified in a user's email, and requiring the user to determine to which of those companies to send opt-out requests may be excessively burdensome to the user.

Figure 5:
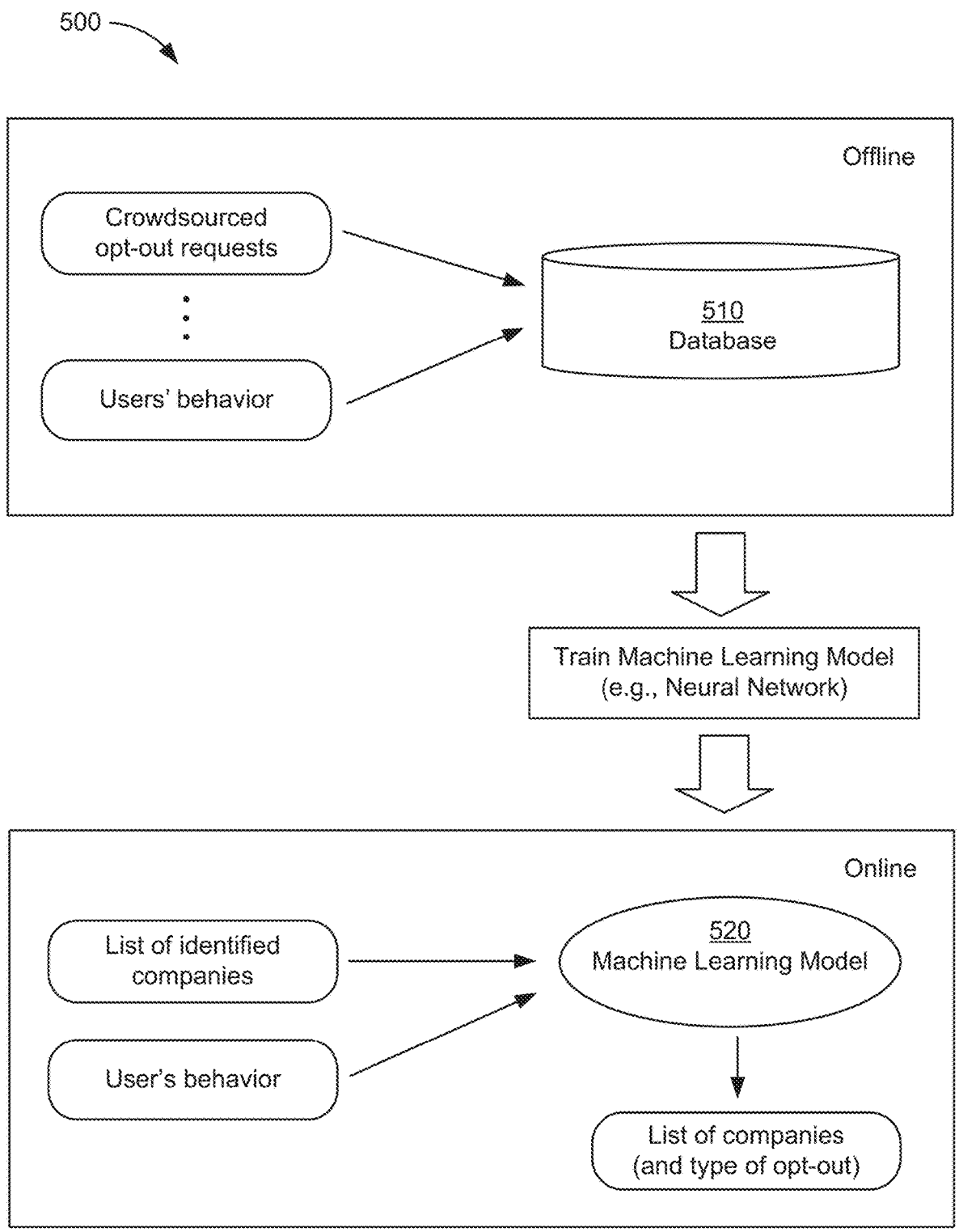
FIG. 5 is a diagram illustrating the use of a machine learning model to recommend companies for opt-out requests, according to aspects of the disclosure.

FIG. 5 is a diagram 500 illustrating the use of a machine learning model to recommend companies for opt-out requests, according to aspects of the disclosure. In the example of FIG. 5, during an "offline" stage, the opt-out choices from (potentially thousands of) other users are stored in a database 510. The database entry for a user's opt-out choice may indicate the company (or email domain) to which the opt-out request was sent and the type of opt-out request (e.g., delete the user's first party data, do not sell the user's first party data, unsubscribe from marketing emails).

In addition, a behavior profile indicating why the respective user selected that opt-out type for that company may be stored in the database 410 for each opt-out entry. For example, the behavior profile for a particular company may indicate whether or not the user opened/read the last email from the company, a ratio of opened/read emails to unopened/unread emails, a ratio of deleted emails to saved emails, the date of the last email received from that company, a number of purchase order confirmation emails from that company, and/or the like. This information may indicate a level of activity with that company that corresponds to the type of opt-out request sent. For example, a greater level of activity may indicate an opt-out request to simply not share user data and a lower level of activity may indicate an opt-out request to delete the user's data. The database 510 may be located, for example, at the privacy server 120 or a third-party server (e.g., a server for the vendor of the machine learning model 520).

Based on the information captured during the offline stage, a machine learning model 520 (e.g., neural network 300 of FIG. 3) is trained to determine which behavior profile elements are relevant to recommending whether to send an opt-out request to a particular company, and if so, what type of opt-out request to send. The machine learning model 520 may use algorithms such as artificial intelligence classification, clustering, collaborative filtering, and/or deep learning to make the recommendations. The machine learning model 520 may be trained at the privacy server 120 (e.g., the opt-out engine 122) or the third-party server.

After training, the machine learning model 520 may receive as input a list of companies (and organizations) for a user, as at stage 220. The machine learning model 520 may also receive behavior profiles for that user related to the list of companies. As described above, the behavior profile for a company may include elements/parameters indicating whether or not the user opened the last email from the company, a ratio of opened emails to unopened emails, a ratio of deleted emails to saved emails, the date of the last email received from that company, a number of purchase order confirmation emails from that company, and/or the like.

Based on these inputs, the machine learning model 520 can output recommended companies from the received list of companies to which the user is likely to want to send opt-out requests. The machine learning model 520 may also recommend the type of opt-out recommended (such as delete, do not sell, or unsubscribe). For example, if the behavior profile for a particular company indicates a greater level of activity with that company, then the machine learning model 520 may recommend an opt-out request to simply not share user data. However, if the behavior profile for a particular company indicates a lower level of activity with that company, then the machine learning model 520 may recommend an opt-out request to delete the user's data and/or to not share the user's data with third parties or affiliates. The machine learning model 520 may be implemented by the privacy application 115 and/or the opt-out engine 122 in FIG. 1.

In an aspect, the recommendations may be listed in order of the confidence or probability that the user is likely to want to send opt-out requests to the corresponding companies. In that case, companies with the highest likelihood of the user wishing to opt-out may be listed first, and then in decreasing order. Companies may also be grouped into ranges of likelihood.

Referring back to FIG. 2, at stages 220, the privacy application 115 displays the list of recommended companies and, if also determined, the recommended type of opt-out request.

Note that the machine learning model 520 may be further trained over time. That is, as more opt-out responses are crowdsourced and more user behavior profiles are gathered, the machine learning model 520 can be further trained based on those responses and behavior profiles, thereby further improving the machine learning model 520 over time. For example, the opt-out responses and user behavior profiles used during the online stage can in turn be used to further train the machine learning model 520 during the offline stage.

As another example of recommending which companies to select at stage 220, instead of a machine learning model, a specific rule-based, or condition-based, algorithm could be used to determine which companies to recommend for opt-out. For example, the algorithm may implement a set of rules, or conditions, to determine whether or not to recommend that the user select that company for opt-out. For example, the algorithm may recommend that the user opt-out based on no emails from a commercial email domain having been opened or there being no recent purchases from that business.

The following table provides example pseudocode for an example rule/condition-based recommendation algorithm.

TABLE 2

Get last opened date;
If time between last opened date and current date is >180 days,
then recommend for opt-out;
else, do not recommend for opt-out;
Get last purchase date;
If time between last purchase date and current date is >180 days,
then recommend for opt-out;
else, do not recommend for opt-out;
. . .

Figure 6:
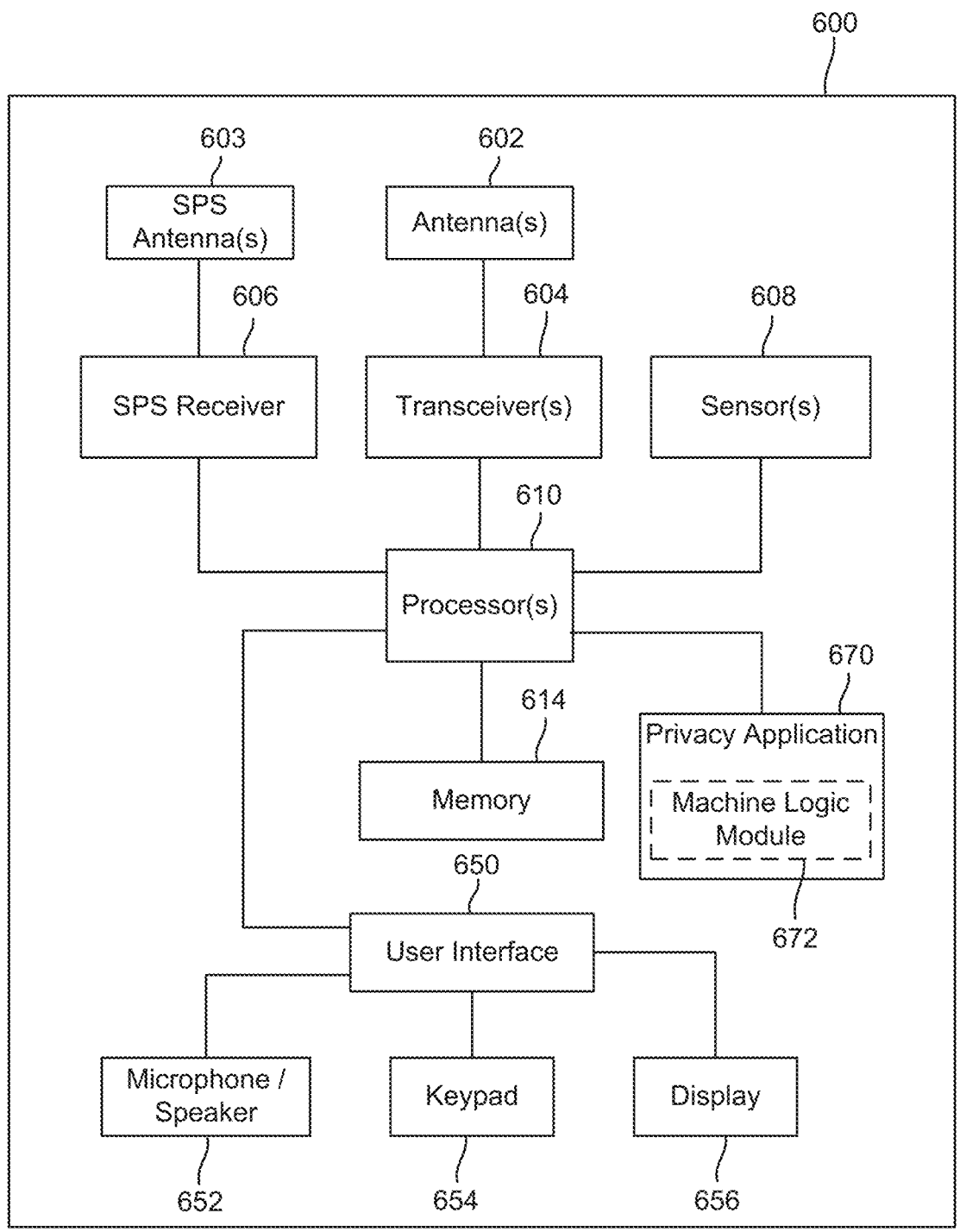
FIG. 6 is a block diagram illustrating various components of an example user device, according to aspects of the disclosure.

FIG. 6 is a block diagram illustrating various components of an example user device 600, according to aspects of the disclosure. In an aspect, the user device may correspond to any of the user devices described herein, such as user device 110 in FIG. 1. As a specific example, the user device 600 may be a smartphone, a tablet computer, a laptop computer, a desktop computer, or the like.

For the sake of simplicity, the various features and functions illustrated in the block diagram of FIG. 6 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual user device. Further, it is also recognized that one or more of the features or functions illustrated in the example of FIG. 6 may be further subdivided, or two or more of the features or functions illustrated in FIG. 6 may be combined.

The user device 600 may include one or more transceivers 604 connected to one or more antennas 602 and providing means for communicating (e.g., means for transmitting, means for receiving, means for measuring, means for tuning, means for refraining from transmitting, etc.) with other network nodes, such as other user devices 110 and/or the privacy server(s) 120 via at least one designated radio access technology (RAT) (e.g., Wi-Fi, Long-Term Evolution (LTE), Fifth Generation New Radio (5G NR), etc.) over one or more wireless communication links. The one or more transceivers 604 may be variously configured for transmitting and encoding wireless signals (e.g., messages, indications, information, and so on), and, conversely, for receiving and decoding wireless signals (e.g., messages, indications, information, pilots, and so on) in accordance with the designated RAT. In an aspect, the one or more transceivers 604 and the antenna(s) 602 may form a (wireless) communication interface of the user device 600.

As used herein, a "transceiver" may include at least one transmitter and at least one receiver in an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 602), such as an antenna array. Similarly, a receiver may include or be coupled to a plurality of antennas (e.g., antenna(s) 602), such as an antenna array. In an aspect, the transmitter(s) and receiver(s) may share the same plurality of antennas (e.g., antenna(s) 602), such that the user device 600 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The user device 600 may also include a satellite positioning system (SPS) receiver 606. The SPS receiver 606 may be connected to the one or more SPS antennas 603 and may provide means for receiving and/or measuring satellite signals. The SPS receiver 606 may comprise any suitable hardware and/or software for receiving and processing SPS signals, such as global positioning system (GPS) signals. The SPS receiver 606 requests information and operations as appropriate from the other systems, and performs the calculations necessary to determine the UE's 600 position using measurements obtained by any suitable SPS algorithm.

One or more sensors 608 may be coupled to one or more processors 610 and may provide means for sensing or detecting information related to the state and/or environment of the user device 600, such as speed, heading (e.g., compass heading), headlight status, gas mileage, etc. By way of example, the one or more sensors 608 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The one or more processors 610 may include one or more central processing units (CPUs), microprocessors, microcontrollers, ASICs, processing cores, DSPs, field-programmable gate arrays (FPGAs), or the like that provide processing functions, as well as other calculation and control functionality. The one or more processors 610 may therefore provide means for processing, such as means for determining, means for calculating, means for receiving, means for transmitting, means for indicating, etc. The one or more processors 610 may include any form of logic suitable for performing, or causing the components of the user device 600 to perform, at least the techniques described herein.

The one or more processors 610 may also be coupled to a memory 614 providing means for storing (including means for retrieving, means for maintaining, etc.) data and software instructions for executing programmed functionality within the user device 600. The memory 614 may be on-board the one or more processors 610 (e.g., within the same integrated circuit (IC) package), and/or the memory 614 may be external to the one or more processors 610 and functionally coupled over a data bus.

The user device 600 may include a user interface 650 that provides any suitable interface systems, such as a microphone/speaker 652, keypad 654, and display 656 that allow user interaction with the user device 600. The microphone/speaker 652 may provide for voice communication services with the user device 600. The keypad 654 may comprise any suitable buttons for user input to the user device 600. The display 656 may comprise any suitable display, such as, for example, a backlit liquid crystal display (LCD), and may further include a touch screen display for additional user input modes. The user interface 650 m ay therefore be a means for providing indications (e.g., audible and/or visual indications) to a user and/or for receiving user input (e.g., via user actuation of a sensing device such a keypad, a touch screen, a microphone, and so on).

In an aspect, the user device 600 may include a privacy application 670 (which may correspond to privacy application 115) coupled to the one or more processors 610. The privacy application 670 may be a hardware, software, or firmware component that, when executed, causes the user device 600 to perform the operations described herein. For example, the privacy application 670 may be a software module stored in memory 614 and executable by the one or more processors 610. As another example, the privacy application 670 may be a hardware circuit (e.g., an ASIC, a field-programmable gate array (FPGA), etc.) within the user device 600. The privacy application 670 may include one or more machine logic modules 672 (e.g., machine learning model 420, machine learning model 520, a keyword-based classification algorithm module, and/or a rule/condition-based recommendation algorithm module). Alternatively, the one or more machine learning models 672 may reside in memory 614. As yet another alternative, the machine logic modules 672 may reside on a remote server (e.g., privacy server 120).

Figure 7:
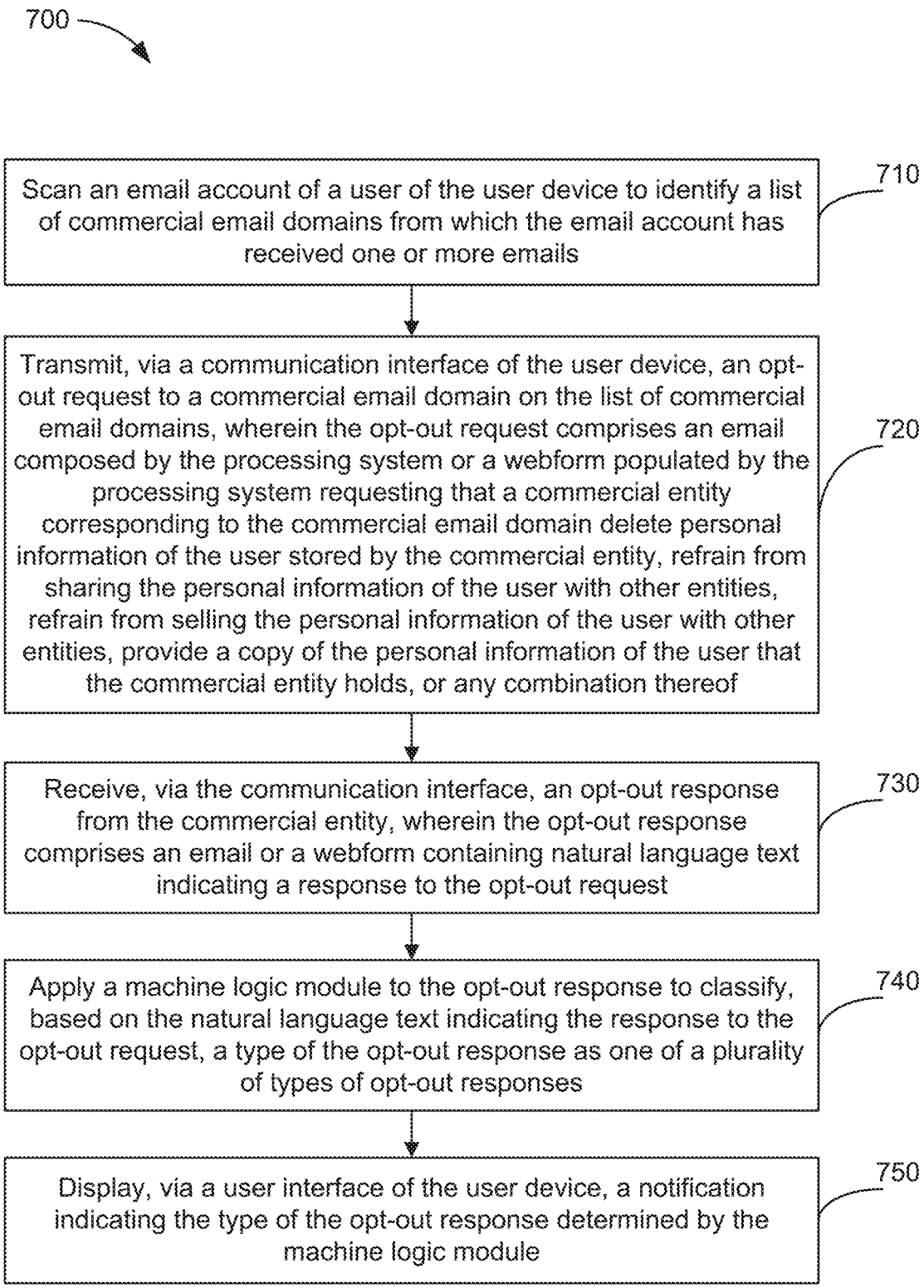
FIGS. 7 to 9 illustrate example methods performed by a processing system of a user device, according to aspects of the disclosure.

FIG. 7 illustrates an example method 700 performed by a processing system of a user device, according to aspects of the disclosure. The user device may correspond to a user device 110 or the user device 600, and the processing system may correspond to, for example, the one or more processors 610 and/or the privacy application 670.

At 710, the processing system scans an email account of a user of the user device to identify a list of commercial email domains from which the email account has received one or more emails, as at stage 210 of FIG. 2.

At 720, the processing system transmits, via a communication interface of the user device (e.g., the one or more transceivers 604), an opt-out request to a commercial email domain on the list of commercial email domains, as at stage 240 of FIG. 2. The opt-out request may comprise an email composed by the processing system or a webform populated by the processing system requesting that a commercial entity (e.g., company, organization, or the like) corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof.

At 730, the processing system receives, via the communication interface, an opt-out response from the commercial entity, as at stage 250 of FIG. 2. The opt-out response may comprise an email or a webform containing natural language text indicating a response to the opt-out request.

At 740, the processing system applies a machine logic module (e.g., a specifically trained machine learning model, such machine learning model 420, a general artificial intelligence machine learning model, a keyword-based classification algorithm module) to the opt-out response to classify, based on the natural language text indicating the response to the opt-out request, a type of the opt-out response as one of a plurality of types of opt-out responses, as at stage 260 of FIG. 2 and as described with reference to FIG. 4.

At 750, the processing system displays, via a user interface of the user device (e.g., user interface 650), a notification indicating the type of the opt-out response determined by the machine logic module.

As will be appreciated, a technical advantage of method 700 is enabling the opt-out response to be properly classified without user interaction, thereby improving the performance of (and therefore user interaction with) the privacy application and the corresponding opt-out service it provides.

Figure 8:
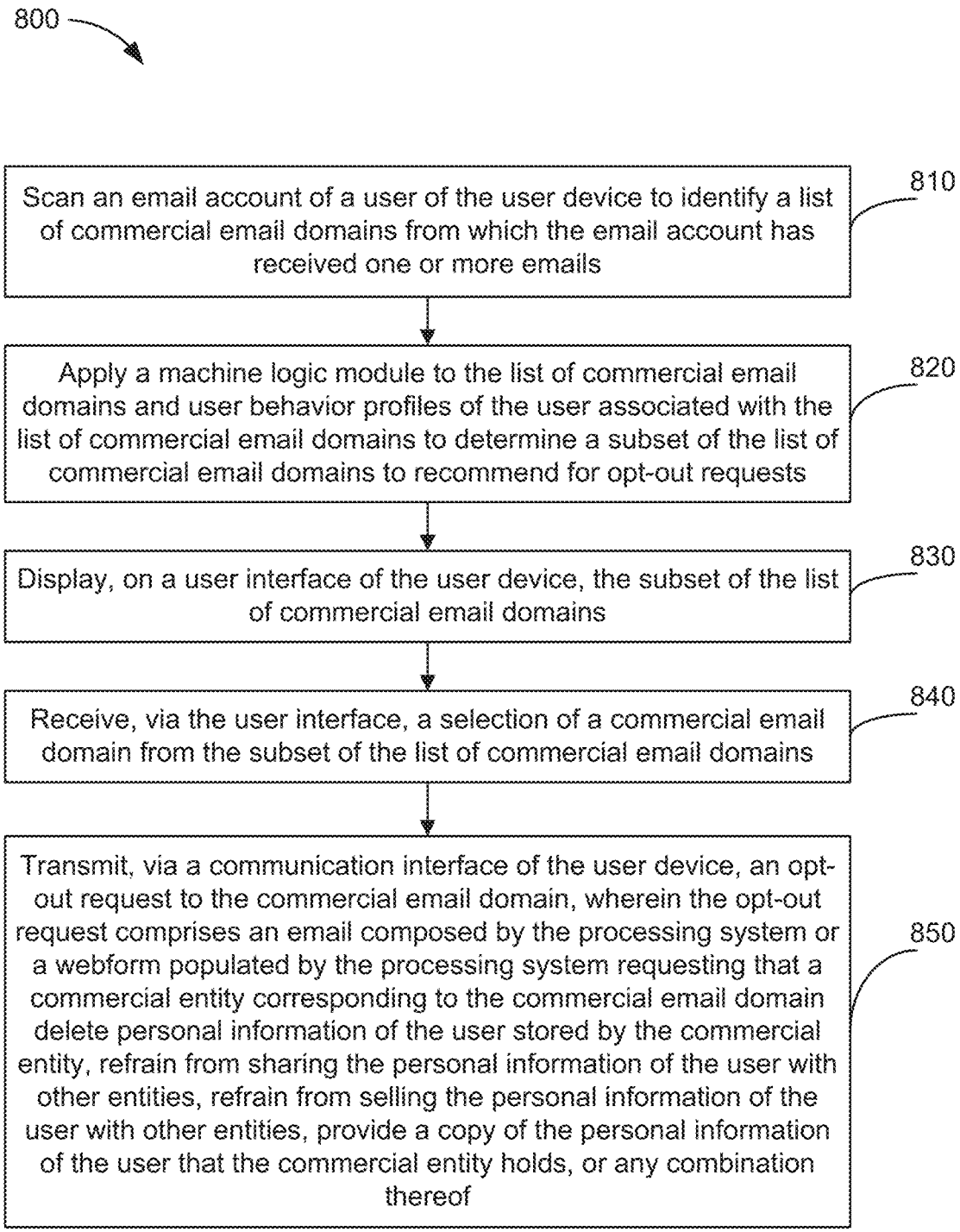

FIG. 8 illustrates an example method 800 performed by a processing system of a user device, according to aspects of the disclosure. The user device may correspond to a user device 110 or the user device 600, and the processing system may correspond to, for example, the one or more processors 610 and/or the privacy application 670.

At 810, the processing system scans an email account of a user of the user device to identify a list of commercial email domains from which the email account has received one or more emails, as at stage 210 of FIG. 2.

At 820, the processing system applies a machine logic module (e.g., a specifically trained machine learning model or a rule/condition-based algorithm, such machine learning model 520, or a rule/condition-based recommendation algorithm module) to the list of commercial email domains and user behavior profiles of the user associated with the list of commercial email domains to determine a subset of the list of commercial email domains to recommend for opt-out requests, as described with reference to FIG. 5.

At 830, the processing system displays, on a user interface of the user device (e.g., user interface 650), the subset of the list of commercial email domains, as at stage 220 of FIG. 2.

At 840, the processing system receives, via the user interface, a selection of a commercial email domain from the subset of the list of commercial email domains, as at stage 230 of FIG. 2.

At 850, the processing system transmits, via a communication interface of the user device (e.g., the one or more transceivers 604), an opt-out request to the commercial email domain, as at stage 240 of FIG. 2. The opt-out request may comprise an email composed by the processing system or a webform populated by the processing system requesting that a commercial entity (e.g., company, organization, or the like) corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof.

Figure 9:
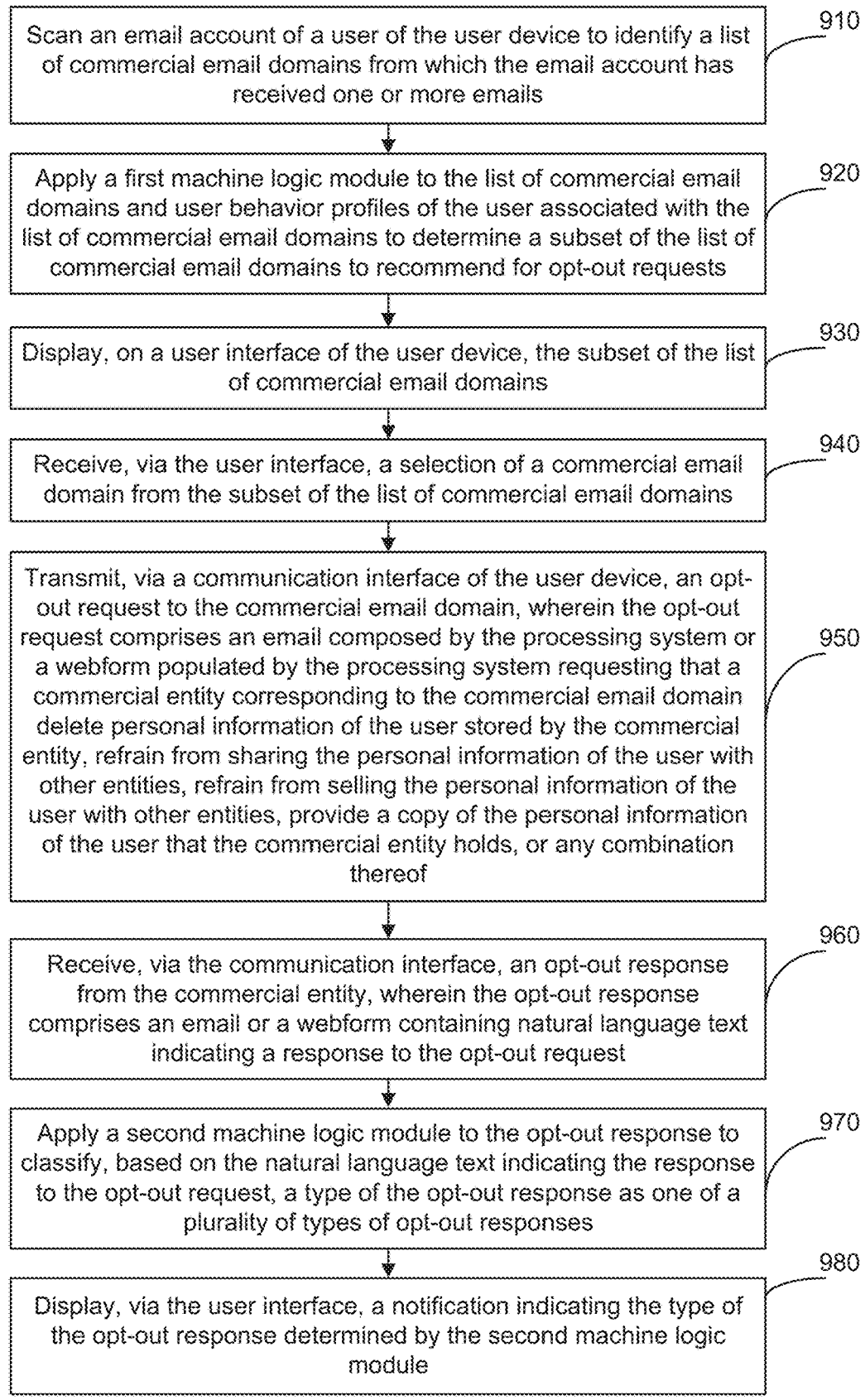

FIG. 9 illustrates an example method 900 performed by a processing system of a user device, according to aspects of the disclosure. The user device may correspond to a user device 110 or the user device 600, and the processing system may correspond to, for example, the one or more processors 610 and/or the privacy application 670.

At 910, the processing system scans an email account of a user of the user device to identify a list of commercial email domains from which the email account has received one or more emails, as at stage 210 of FIG. 2.

At 920, the processing system applies a first machine logic module (e.g., a specifically trained machine learning model, such machine learning model 520, or a condition/rule-based recommendation algorithm module) to the list of commercial email domains and user behavior profiles of the user associated with the list of commercial email domains to determine a subset of the list of commercial email domains to recommend for opt-out requests, as described with reference to FIG. 5.

At 930, the processing system displays, on a user interface of the user device (e.g., user interface 650), the subset of the list of commercial email domains, as at stage 220 of FIG. 2.

At 940, the processing system receives, via the user interface, a selection of a commercial email domain from the subset of the list of commercial email domains, as at stage 230 of FIG. 2.

At 950, the processing system transmits, via a communication interface of the user device (e.g., the one or more transceivers 604), an opt-out request to the commercial email domain, as at stage 240 of FIG. 2. The opt-out request may comprise an email composed by the processing system or a webform populated by the processing system requesting that a commercial entity (e.g., company, organization, or the like) corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof.

At 960, the processing system receives, via the communication interface, an opt-out response from the commercial entity, wherein the opt-out response comprises an email or a webform containing natural language text indicating a response to the opt-out request, as at stage 250 of FIG. 2.

At 970, the processing system applies a second machine logic module (e.g., a specifically trained machine learning model, such machine learning model 420, a general artificial intelligence machine learning model, a keyword-based classification algorithm module) to the opt-out response to classify, based on the natural language text indicating the response to the opt-out request, a type of the opt-out response as one of a plurality of types of opt-out responses, as at stage 260 of FIG. 2.

At 980, the processing system displays, via the user interface, a notification indicating the type of the opt-out response determined by the second machine logic module.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method performed by a processing system of a user device, comprising: scanning an email account of a user of the user device to identify a list of commercial email domains from which the email account has received one or more emails; transmitting, via a communication interface of the user device, an opt-out request to a commercial email domain on the list of commercial email domains, wherein the opt-out request comprises an email composed by the processing system or a webform populated by the processing system requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof; receiving, via the communication interface, an opt-out response from the commercial entity, wherein the opt-out response comprises an email or a webform containing natural language text indicating a response to the opt-out request; applying a machine logic module to the opt-out response to classify, based on the natural language text indicating the response to the opt-out request, a type of the opt-out response as one of a plurality of types of opt-out responses; and displaying, via a user interface of the user device, a notification indicating the type of the opt-out response determined by the machine logic module.

Clause 2. The method of clause 1, wherein the plurality of types of opt-out responses comprises: the opt-out request is complete, the personal information of the user has been deleted, the commercial entity will not share the personal information of the user, the commercial entity will not sell the personal information of the user, the personal information of the user was not found, more information is needed to complete the opt-out request, more steps are needed to complete the opt-out request, or any combination thereof.

Clause 3. The method of any of clauses 1 to 2, wherein the notification indicating the type of the opt-out response comprises: the opt-out request is complete, an indication that the personal information of the user was successfully deleted, an indication that the commercial entity will not share the personal information of the user, an indication that the commercial entity will not sell the personal information of the user, an indication that the personal information of the user was not found, an indication that additional information is needed to complete the opt-out request, or an indication that additional steps are needed to complete the opt-out request.

Clause 4. The method of any of clauses 1 to 3, wherein the machine logic module comprises a natural language processing (NLP) machine learning model.

Clause 5. The method of clause 4, wherein the NLP machine learning model is trained on a plurality of human-classified full-text natural language opt-out responses from a plurality of commercial entities.

Clause 6. The method of any of clauses 4 to 5, further comprising: transmitting, to a server, via the communication interface, the opt-out response and the type of the opt-out response to enable the server to retrain the NLP machine learning model.

Clause 7. The method of any of clauses 1 to 6, wherein: the type of the opt-out response indicates that additional information is needed to complete the opt-out request, the opt-out response includes an email address or a hyperlink to a webform for providing the additional information, and the method further comprises: populating the webform with the additional information; or transmitting, via the communication interface, an email including the additional information to the email address.

Clause 8. The method of any of clauses 1 to 7, further comprising: receiving the machine logic module from a server.

Clause 9. The method of any of clauses 1 to 8, wherein applying the machine logic module comprises: transmitting, via the communication interface, the opt-out response to a server implementing the machine logic module; and receiving, via the communication interface, the type of the opt-out response from the server.

Clause 10. A method performed by a processing system of a user device, comprising: scanning an email account of a user of the user device to identify a list of commercial email domains from which the email account has received one or more emails; applying a machine logic module to the list of commercial email domains and user behavior profiles of the user associated with the list of commercial email domains to determine a subset of the list of commercial email domains to recommend for opt-out requests; displaying, on a user interface of the user device, the subset of the list of commercial email domains; receiving, via the user interface, a selection of a commercial email domain from the subset of the list of commercial email domains; and transmitting, via a communication interface of the user device, an opt-out request to the commercial email domain, wherein the opt-out request comprises an email composed by the processing system or a webform populated by the processing system requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof.

Clause 11. The method of clause 10, wherein a user behavior profile of the user associated with the commercial email domain indicates: whether any emails from the commercial email domain have been opened, a number of emails from the commercial email domain that have been opened, a number of emails from the commercial email domain that have not been opened, a ratio of the number of emails from the commercial email domain that have been opened to the number of emails from the commercial email domain that have not been opened, a date of a most recently opened email from the commercial email domain, a date of a most recently received email from the commercial email domain, a number of purchase confirmation emails from the commercial email domain, a date of a most recent purchase confirmation email from the commercial email domain, or any combination thereof.

Clause 12. The method of any of clauses 10 to 11, wherein application of the machine logic module to the list of commercial email domains and the user behavior profiles of the user associated with the list of commercial email domains further determines recommended types of opt-out requests to transmit to the subset of the list of commercial email domains.

Clause 13. The method of clause 12, wherein the recommended types of opt-out requests comprise: requests to delete personal information of the user stored by commercial entities corresponding to the subset of the list of commercial email domains, requests to refrain from sharing the personal information of the user with other entities, requests to refrain from selling the personal information of the user with other entities, or any combination thereof.

Clause 14. The method of any of clauses 12 to 13, further comprising: displaying, via the user interface, the recommended types of opt-out requests with the subset of the list of commercial email domains.

Clause 15. The method of any of clauses 10 to 14, wherein: the machine logic module comprises a natural language processing (NLP) machine learning model, and the NLP machine learning model is trained on a plurality of opt-out requests for a plurality of users for a plurality of commercial email domains and user behavior profiles for the plurality of users associated with the plurality of commercial email domains.

Clause 16. The method of clause 15, further comprising: transmitting, to a server, via the communication interface, the opt-out request and a user behavior profile of the user associated with the commercial email domain to enable the server to retrain the NLP machine learning model.

Clause 17. The method of any of clauses 10 to 16, wherein applying the machine logic module comprises: transmitting, to a server, via the communication interface, the list of commercial email domains and the user behavior profiles of the user associated with the list of commercial email domains; and receiving, from the server, via the communication interface, the subset of the list of commercial email domains.

Clause 18. The method of any of clauses 10 to 17, wherein the list of commercial email domains from which the email account has received one or more emails comprises: all commercial email domains from which the email account has received one or more emails, or only commercial email domains from which the email account has received one or more emails that are included in a database of commercial email domains.

Clause 19. The method of any of clauses 10 to 18, further comprising: receiving, via the communication interface, an opt-out response from the commercial entity, wherein the opt-out response comprises an email or a webform containing natural language text indicating a response to the opt-out request; applying a machine learning model to the opt-out response to classify, based on the natural language text indicating the response to the opt-out request, a type of the opt-out response as one of a plurality of types of opt-out responses; and displaying, via the user interface, a notification indicating the type of the opt-out response determined by the machine learning model.

Clause 20. A method performed by a processing system of a user device, comprising: scanning an email account of a user of the user device to identify a list of commercial email domains from which the email account has received one or more emails; applying a first machine logic module to the list of commercial email domains and user behavior profiles of the user associated with the list of commercial email domains to determine a subset of the list of commercial email domains to recommend for opt-out requests; displaying, on a user interface of the user device, the subset of the list of commercial email domains; receiving, via the user interface, a selection of a commercial email domain from the subset of the list of commercial email domains; transmitting, via a communication interface of the user device, an opt-out request to the commercial email domain, wherein the opt-out request comprises an email composed by the processing system or a webform populated by the processing system requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof; receiving, via the communication interface, an opt-out response from the commercial entity, wherein the opt-out response comprises an email or a webform containing natural language text indicating a response to the opt-out request; applying a second machine logic module to the opt-out response to classify, based on the natural language text indicating the response to the opt-out request, a type of the opt-out response as one of a plurality of types of opt-out responses; and displaying, via the user interface, a notification indicating the type of the opt-out response determined by the second machine logic module.

Clause 21. An apparatus, comprising: one or more memories; one or more transceivers; and one or more processors communicatively coupled to the one or more memories and the one or more transceivers, the one or more processors, either alone or in combination, configured to: scan an email account of a user of the user device to identify a list of commercial email domains from which the email account has received one or more emails; transmit, via the one or more transceivers, an opt-out request to a commercial email domain on the list of commercial email domains, wherein the opt-out request comprises an email composed by the one or more processors or a webform populated by the one or more processors requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof; receive, via the one or more transceivers, an opt-out response from the commercial entity, wherein the opt-out response comprises an email or a webform containing natural language text indicating a response to the opt-out request; apply a machine logic module to the opt-out response to classify, based on the natural language text indicating the response to the opt-out request, a type of the opt-out response as one of a plurality of types of opt-out responses; and display, via a user interface of the user device, a notification indicating the type of the opt-out response determined by the machine logic module.

Clause 22. The apparatus of clause 21, wherein the plurality of types of opt-out responses comprises: the opt-out request is complete, the personal information of the user has been deleted, the commercial entity will not share the personal information of the user, the commercial entity will not sell the personal information of the user, the personal information of the user was not found, more information is needed to complete the opt-out request, more steps are needed to complete the opt-out request, or any combination thereof.

Clause 23. The apparatus of any of clauses 21 to 22, wherein the notification indicating the type of the opt-out response comprises: the opt-out request is complete, an indication that the personal information of the user was successfully deleted, an indication that the commercial entity will not share the personal information of the user, an indication that the commercial entity will not sell the personal information of the user, an indication that the personal information of the user was not found, an indication that additional information is needed to complete the opt-out request, or an indication that additional steps are needed to complete the opt-out request.

Clause 24. The apparatus of any of clauses 21 to 23, wherein the machine logic module comprises a natural language processing (NLP) machine learning model.

Clause 25. The apparatus of clause 24, wherein the NLP machine learning model is trained on a plurality of human-classified full-text natural language opt-out responses from a plurality of commercial entities.

Clause 26. The apparatus of any of clauses 24 to 25, wherein the one or more processors, either alone or in combination, are further configured to: transmit, via the one or more transceivers, to a server, the opt-out response and the type of the opt-out response to enable the server to retrain the NLP machine learning model.

Clause 27. The apparatus of any of clauses 21 to 26, wherein: the type of the opt-out response indicates that additional information is needed to complete the opt-out request, the opt-out response includes an email address or a hyperlink to a webform for providing the additional information, and the one or more processors, either alone or in combination, are further configured to: populate the webform with the additional information; or transmit, via the one or more transceivers, an email including the additional information to the email address.

Clause 28. The apparatus of any of clauses 21 to 27, wherein the one or more processors, either alone or in combination, are further configured to: receive, via the one or more transceivers, the machine logic module from a server.

Clause 29. The apparatus of any of clauses 21 to 28, wherein the one or more processors configured to apply the machine logic module comprises the one or more processors, either alone or in combination, configured to: transmit, via the one or more transceivers, the opt-out response to a server implementing the machine logic module; and receive, via the one or more transceivers, the type of the opt-out response from the server.

Clause 30. An apparatus, comprising: one or more memories; one or more transceivers; and one or more processors communicatively coupled to the one or more memories and the one or more transceivers, the one or more processors, either alone or in combination, configured to: scan an email account of a user of the user device to identify a list of commercial email domains from which the email account has received one or more emails; apply a machine logic module to the list of commercial email domains and user behavior profiles of the user associated with the list of commercial email domains to determine a subset of the list of commercial email domains to recommend for opt-out requests; display, on a user interface of the user device, the subset of the list of commercial email domains; receive, via the one or more transceivers, via the user interface, a selection of a commercial email domain from the subset of the list of commercial email domains; and transmit, via the one or more transceivers, an opt-out request to the commercial email domain, wherein the opt-out request comprises an email composed by the one or more processors or a webform populated by the one or more processors requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof.

Clause 31. The apparatus of clause 30, wherein a user behavior profile of the user associated with the commercial email domain indicates: whether any emails from the commercial email domain have been opened, a number of emails from the commercial email domain that have been opened, a number of emails from the commercial email domain that have not been opened, a ratio of the number of emails from the commercial email domain that have been opened to the number of emails from the commercial email domain that have not been opened, a date of a most recently opened email from the commercial email domain, a date of a most recently received email from the commercial email domain, a number of purchase confirmation emails from the commercial email domain, a date of a most recent purchase confirmation email from the commercial email domain, or any combination thereof.

Clause 32. The apparatus of any of clauses 30 to 31, wherein application of the machine logic module to the list of commercial email domains and the user behavior profiles of the user associated with the list of commercial email domains further determines recommended types of opt-out requests to transmit to the subset of the list of commercial email domains.

Clause 33. The apparatus of clause 32, wherein the recommended types of opt-out requests comprise: requests to delete personal information of the user stored by commercial entities corresponding to the subset of the list of commercial email domains, requests to refrain from sharing the personal information of the user with other entities, requests to refrain from selling the personal information of the user with other entities, or any combination thereof.

Clause 34. The apparatus of any of clauses 32 to 33, wherein the one or more processors, either alone or in combination, are further configured to: display, via the user interface, the recommended types of opt-out requests with the subset of the list of commercial email domains.

Clause 35. The apparatus of any of clauses 30 to 34, wherein: the machine logic module comprises a natural language processing (NLP) machine learning model, and the NLP machine learning model is trained on a plurality of opt-out requests for a plurality of users for a plurality of commercial email domains and user behavior profiles for the plurality of users associated with the plurality of commercial email domains.

Clause 36. The apparatus of clause 35, wherein the one or more processors, either alone or in combination, are further configured to: transmit, via the one or more transceivers, to a server, the opt-out request and a user behavior profile of the user associated with the commercial email domain to enable the server to retrain the NLP machine learning model.

Clause 37. The apparatus of any of clauses 30 to 36, wherein the one or more processors configured to apply the machine logic module comprises the one or more processors, either alone or in combination, configured to: transmit, via the one or more transceivers, to a server, the list of commercial email domains and the user behavior profiles of the user associated with the list of commercial email domains; and receive, via the one or more transceivers, from the server, the subset of the list of commercial email domains.

Clause 38. The apparatus of any of clauses 30 to 37, wherein the list of commercial email domains from which the email account has received one or more emails comprises: all commercial email domains from which the email account has received one or more emails, or only commercial email domains from which the email account has received one or more emails that are included in a database of commercial email domains.

Clause 39. The apparatus of any of clauses 30 to 38, wherein the one or more processors, either alone or in combination, are further configured to: receive, via the one or more transceivers, an opt-out response from the commercial entity, wherein the opt-out response comprises an email or a webform containing natural language text indicating a response to the opt-out request; apply a machine learning model to the opt-out response to classify, based on the natural language text indicating the response to the opt-out request, a type of the opt-out response as one of a plurality of types of opt-out responses; and display, via the user interface, a notification indicating the type of the opt-out response determined by the machine learning model.

Clause 40. An apparatus, comprising: one or more memories; one or more transceivers; and one or more processors communicatively coupled to the one or more memories and the one or more transceivers, the one or more processors, either alone or in combination, configured to: scan an email account of a user of the user device to identify a list of commercial email domains from which the email account has received one or more emails; apply a first machine logic module to the list of commercial email domains and user behavior profiles of the user associated with the list of commercial email domains to determine a subset of the list of commercial email domains to recommend for opt-out requests; display, on a user interface of the user device, the subset of the list of commercial email domains; receive, via the one or more transceivers, via the user interface, a selection of a commercial email domain from the subset of the list of commercial email domains; transmit, via the one or more transceivers, an opt-out request to the commercial email domain, wherein the opt-out request comprises an email composed by the one or more processors or a webform populated by the one or more processors requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof; receive, via the one or more transceivers, an opt-out response from the commercial entity, wherein the opt-out response comprises an email or a webform containing natural language text indicating a response to the opt-out request; apply a second machine logic module to the opt-out response to classify, based on the natural language text indicating the response to the opt-out request, a type of the opt-out response as one of a plurality of types of opt-out responses; and display, via the user interface, a notification indicating the type of the opt-out response determined by the second machine logic module.

Clause 41. An apparatus, comprising: means for scanning an email account of a user of the user device to identify a list of commercial email domains from which the email account has received one or more emails; means for transmitting, via a communication interface of the user device, an opt-out request to a commercial email domain on the list of commercial email domains, wherein the opt-out request comprises an email composed by the apparatus or a webform populated by the apparatus requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof; means for receiving, via the communication interface, an opt-out response from the commercial entity, wherein the opt-out response comprises an email or a webform containing natural language text indicating a response to the opt-out request; means for applying a machine logic module to the opt-out response to classify, based on the natural language text indicating the response to the opt-out request, a type of the opt-out response as one of a plurality of types of opt-out responses; and means for displaying, via a user interface of the user device, a notification indicating the type of the opt-out response determined by the machine logic module.

Clause 42. The apparatus of clause 41, wherein the plurality of types of opt-out responses comprises: the opt-out request is complete, the personal information of the user has been deleted, the commercial entity will not share the personal information of the user, the commercial entity will not sell the personal information of the user, the personal information of the user was not found, more information is needed to complete the opt-out request, more steps are needed to complete the opt-out request, or any combination thereof.

Clause 43. The apparatus of any of clauses 41 to 42, wherein the notification indicating the type of the opt-out response comprises: the opt-out request is complete, an indication that the personal information of the user was successfully deleted, an indication that the commercial entity will not share the personal information of the user, an indication that the commercial entity will not sell the personal information of the user, an indication that the personal information of the user was not found, an indication that additional information is needed to complete the opt-out request, or an indication that additional steps are needed to complete the opt-out request.

Clause 44. The apparatus of any of clauses 41 to 43, wherein the machine logic module comprises a natural language processing (NLP) machine learning model.

Clause 45. The apparatus of clause 44, wherein the NLP machine learning model is trained on a plurality of human-classified full-text natural language opt-out responses from a plurality of commercial entities.

Clause 46. The apparatus of any of clauses 44 to 45, further comprising: means for transmitting, to a server, via the communication interface, the opt-out response and the type of the opt-out response to enable the server to retrain the NLP machine learning model.

Clause 47. The apparatus of any of clauses 41 to 46, wherein: the type of the opt-out response indicates that additional information is needed to complete the opt-out request, the opt-out response includes an email address or a hyperlink to a webform for providing the additional information, and the apparatus further comprises: means for populating the webform with the additional information; or means for transmitting, via the communication interface, an email including the additional information to the email address.

Clause 48. The apparatus of any of clauses 41 to 47, further comprising: means for receiving the machine logic module from a server.

Clause 49. The apparatus of any of clauses 41 to 48, wherein the means for applying the machine logic module comprises: means for transmitting, via the communication interface, the opt-out response to a server implementing the machine logic module; and means for receiving, via the communication interface, the type of the opt-out response from the server.

Clause 50. An apparatus, comprising: means for scanning an email account of a user of the user device to identify a list of commercial email domains from which the email account has received one or more emails; means for applying a machine logic module to the list of commercial email domains and user behavior profiles of the user associated with the list of commercial email domains to determine a subset of the list of commercial email domains to recommend for opt-out requests; means for displaying, on a user interface of the user device, the subset of the list of commercial email domains; means for receiving, via the user interface, a selection of a commercial email domain from the subset of the list of commercial email domains; and means for transmitting, via a communication interface of the user device, an opt-out request to the commercial email domain, wherein the opt-out request comprises an email composed by the apparatus or a webform populated by the apparatus requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof.

Clause 51. The apparatus of clause 50, wherein a user behavior profile of the user associated with the commercial email domain indicates: whether any emails from the commercial email domain have been opened, a number of emails from the commercial email domain that have been opened, a number of emails from the commercial email domain that have not been opened, a ratio of the number of emails from the commercial email domain that have been opened to the number of emails from the commercial email domain that have not been opened, a date of a most recently opened email from the commercial email domain, a date of a most recently received email from the commercial email domain, a number of purchase confirmation emails from the commercial email domain, a date of a most recent purchase confirmation email from the commercial email domain, or any combination thereof.

Clause 52. The apparatus of any of clauses 50 to 51, wherein application of the machine logic module to the list of commercial email domains and the user behavior profiles of the user associated with the list of commercial email domains further determines recommended types of opt-out requests to transmit to the subset of the list of commercial email domains.

Clause 53. The apparatus of clause 52, wherein the recommended types of opt-out requests comprise: requests to delete personal information of the user stored by commercial entities corresponding to the subset of the list of commercial email domains, requests to refrain from sharing the personal information of the user with other entities, requests to refrain from selling the personal information of the user with other entities, or any combination thereof.

Clause 54. The apparatus of any of clauses 52 to 53, further comprising: means for displaying, via the user interface, the recommended types of opt-out requests with the subset of the list of commercial email domains.

Clause 55. The apparatus of any of clauses 50 to 54, wherein: the machine logic module comprises a natural language processing (NLP) machine learning model, and the NLP machine learning model is trained on a plurality of opt-out requests for a plurality of users for a plurality of commercial email domains and user behavior profiles for the plurality of users associated with the plurality of commercial email domains.

Clause 56. The apparatus of clause 55, further comprising: means for transmitting, to a server, via the communication interface, the opt-out request and a user behavior profile of the user associated with the commercial email domain to enable the server to retrain the NLP machine learning model.

Clause 57. The apparatus of any of clauses 50 to 56, wherein the means for applying the machine logic module comprises: means for transmitting, to a server, via the communication interface, the list of commercial email domains and the user behavior profiles of the user associated with the list of commercial email domains; and means for receiving, from the server, via the communication interface, the subset of the list of commercial email domains.

Clause 58. The apparatus of any of clauses 50 to 57, wherein the list of commercial email domains from which the email account has received one or more emails comprises: all commercial email domains from which the email account has received one or more emails, or only commercial email domains from which the email account has received one or more emails that are included in a database of commercial email domains.

Clause 59. The apparatus of any of clauses 50 to 58, further comprising: means for receiving, via the communication interface, an opt-out response from the commercial entity, wherein the opt-out response comprises an email or a webform containing natural language text indicating a response to the opt-out request; means for applying a machine learning model to the opt-out response to classify, based on the natural language text indicating the response to the opt-out request, a type of the opt-out response as one of a plurality of types of opt-out responses; and means for displaying, via the user interface, a notification indicating the type of the opt-out response determined by the machine learning model.

Clause 60. An apparatus, comprising: means for scanning an email account of a user of the user device to identify a list of commercial email domains from which the email account has received one or more emails; means for applying a first machine logic module to the list of commercial email domains and user behavior profiles of the user associated with the list of commercial email domains to determine a subset of the list of commercial email domains to recommend for opt-out requests; means for displaying, on a user interface of the user device, the subset of the list of commercial email domains; means for receiving, via the user interface, a selection of a commercial email domain from the subset of the list of commercial email domains; means for transmitting, via a communication interface of the user device, an opt-out request to the commercial email domain, wherein the opt-out request comprises an email composed by the apparatus or a webform populated by the apparatus requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof; means for receiving, via the communication interface, an opt-out response from the commercial entity, wherein the opt-out response comprises an email or a webform containing natural language text indicating a response to the opt-out request; means for applying a second machine logic module to the opt-out response to classify, based on the natural language text indicating the response to the opt-out request, a type of the opt-out response as one of a plurality of types of opt-out responses; and means for displaying, via the user interface, a notification indicating the type of the opt-out response determined by the second machine logic module.

Clause 61. A non-transitory computer-readable medium storing computer-executable instructions that, when executed by a processing system of a user device, cause the processing system to: scan an email account of a user of the user device to identify a list of commercial email domains from which the email account has received one or more emails; transmit, via a communication interface of the user device, an opt-out request to a commercial email domain on the list of commercial email domains, wherein the opt-out request comprises an email composed by the processing system or a webform populated by the processing system requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof; receive, via the communication interface, an opt-out response from the commercial entity, wherein the opt-out response comprises an email or a webform containing natural language text indicating a response to the opt-out request; apply a machine logic module to the opt-out response to classify, based on the natural language text indicating the response to the opt-out request, a type of the opt-out response as one of a plurality of types of opt-out responses; and display, via a user interface of the user device, a notification indicating the type of the opt-out response determined by the machine logic module.

Clause 62. The non-transitory computer-readable medium of clause 61, wherein the plurality of types of opt-out responses comprises: the opt-out request is complete, the personal information of the user has been deleted, the commercial entity will not share the personal information of the user, the commercial entity will not sell the personal information of the user, the personal information of the user was not found, more information is needed to complete the opt-out request, more steps are needed to complete the opt-out request, or any combination thereof.

Clause 63. The non-transitory computer-readable medium of any of clauses 61 to 62, wherein the notification indicating the type of the opt-out response comprises: the opt-out request is complete, an indication that the personal information of the user was successfully deleted, an indication that the commercial entity will not share the personal information of the user, an indication that the commercial entity will not sell the personal information of the user, an indication that the personal information of the user was not found, an indication that additional information is needed to complete the opt-out request, or an indication that additional steps are needed to complete the opt-out request.

Clause 64. The non-transitory computer-readable medium of any of clauses 61 to 63, wherein the machine logic module comprises a natural language processing (NLP) machine learning model.

Clause 65. The non-transitory computer-readable medium of clause 64, wherein the NLP machine learning model is trained on a plurality of human-classified full-text natural language opt-out responses from a plurality of commercial entities.

Clause 66. The non-transitory computer-readable medium of any of clauses 64 to 65, further comprising computer-executable instructions that, when executed by the processing system, cause the processing system to: transmit, to a server, via the communication interface, the opt-out response and the type of the opt-out response to enable the server to retrain the NLP machine learning model.

Clause 67. The non-transitory computer-readable medium of any of clauses 61 to 66, wherein: the type of the opt-out response indicates that additional information is needed to complete the opt-out request, the opt-out response includes an email address or a hyperlink to a webform for providing the additional information, and the non-transitory computer-readable medium further comprises computer-executable instructions that, when executed by the processing system, cause the processing system to: populate the webform with the additional information; or transmit, via the communication interface, an email including the additional information to the email address.

Clause 68. The non-transitory computer-readable medium of any of clauses 61 to 67, further comprising computer-executable instructions that, when executed by the processing system, cause the processing system to: receive the machine logic module from a server.

Clause 69. The non-transitory computer-readable medium of any of clauses 61 to 68, wherein the computer-executable instructions that, when executed by the processing system, cause the processing system to apply the machine logic module comprise computer-executable instructions that, when executed by the processing system, cause the processing system to: transmit, via the communication interface, the opt-out response to a server implementing the machine logic module; and receive, via the communication interface, the type of the opt-out response from the server.

Clause 70. A non-transitory computer-readable medium storing computer-executable instructions that, when executed by a processing system of a user device, cause the processing system to: scan an email account of a user of the user device to identify a list of commercial email domains from which the email account has received one or more emails; apply a machine logic module to the list of commercial email domains and user behavior profiles of the user associated with the list of commercial email domains to determine a subset of the list of commercial email domains to recommend for opt-out requests; display, on a user interface of the user device, the subset of the list of commercial email domains; receive, via the user interface, a selection of a commercial email domain from the subset of the list of commercial email domains; and transmit, via a communication interface of the user device, an opt-out request to the commercial email domain, wherein the opt-out request comprises an email composed by the processing system or a webform populated by the processing system requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof.

Clause 71. The non-transitory computer-readable medium of clause 70, wherein a user behavior profile of the user associated with the commercial email domain indicates: whether any emails from the commercial email domain have been opened, a number of emails from the commercial email domain that have been opened, a number of emails from the commercial email domain that have not been opened, a ratio of the number of emails from the commercial email domain that have been opened to the number of emails from the commercial email domain that have not been opened, a date of a most recently opened email from the commercial email domain, a date of a most recently received email from the commercial email domain, a number of purchase confirmation emails from the commercial email domain, a date of a most recent purchase confirmation email from the commercial email domain, or any combination thereof.

Clause 72. The non-transitory computer-readable medium of any of clauses 70 to 71, wherein application of the machine logic module to the list of commercial email domains and the user behavior profiles of the user associated with the list of commercial email domains further determines recommended types of opt-out requests to transmit to the subset of the list of commercial email domains.

Clause 73. The non-transitory computer-readable medium of clause 72, wherein the recommended types of opt-out requests comprise: requests to delete personal information of the user stored by commercial entities corresponding to the subset of the list of commercial email domains, requests to refrain from sharing the personal information of the user with other entities, requests to refrain from selling the personal information of the user with other entities, or any combination thereof.

Clause 74. The non-transitory computer-readable medium of any of clauses 72 to 73, further comprising computer-executable instructions that, when executed by the processing system, cause the processing system to: display, via the user interface, the recommended types of opt-out requests with the subset of the list of commercial email domains.

Clause 75. The non-transitory computer-readable medium of any of clauses 70 to 74, wherein: the machine logic module comprises a natural language processing (NLP) machine learning model, and the NLP machine learning model is trained on a plurality of opt-out requests for a plurality of users for a plurality of commercial email domains and user behavior profiles for the plurality of users associated with the plurality of commercial email domains.

Clause 76. The non-transitory computer-readable medium of clause 75, further comprising computer-executable instructions that, when executed by the processing system, cause the processing system to: transmit, to a server, via the communication interface, the opt-out request and a user behavior profile of the user associated with the commercial email domain to enable the server to retrain the NLP machine learning model.

Clause 77. The non-transitory computer-readable medium of any of clauses 70 to 76, wherein the computer-executable instructions that, when executed by the processing system, cause the processing system to apply the machine logic module comprise computer-executable instructions that, when executed by the processing system, cause the processing system to: transmit, to a server, via the communication interface, the list of commercial email domains and the user behavior profiles of the user associated with the list of commercial email domains; and receive, from the server, via the communication interface, the subset of the list of commercial email domains.

Clause 78. The non-transitory computer-readable medium of any of clauses 70 to 77, wherein the list of commercial email domains from which the email account has received one or more emails comprises: all commercial email domains from which the email account has received one or more emails, or only commercial email domains from which the email account has received one or more emails that are included in a database of commercial email domains.

Clause 79. The non-transitory computer-readable medium of any of clauses 70 to 78, further comprising computer-executable instructions that, when executed by the processing system, cause the processing system to: receive, via the communication interface, an opt-out response from the commercial entity, wherein the opt-out response comprises an email or a webform containing natural language text indicating a response to the opt-out request; apply a machine learning model to the opt-out response to classify, based on the natural language text indicating the response to the opt-out request, a type of the opt-out response as one of a plurality of types of opt-out responses; and display, via the user interface, a notification indicating the type of the opt-out response determined by the machine learning model.

Clause 80. A non-transitory computer-readable medium storing computer-executable instructions that, when executed by a processing system of a user device, cause the processing system to: scan an email account of a user of the user device to identify a list of commercial email domains from which the email account has received one or more emails; apply a first machine logic module to the list of commercial email domains and user behavior profiles of the user associated with the list of commercial email domains to determine a subset of the list of commercial email domains to recommend for opt-out requests; display, on a user interface of the user device, the subset of the list of commercial email domains; receive, via the user interface, a selection of a commercial email domain from the subset of the list of commercial email domains; transmit, via a communication interface of the user device, an opt-out request to the commercial email domain, wherein the opt-out request comprises an email composed by the processing system or a webform populated by the processing system requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof; receive, via the communication interface, an opt-out response from the commercial entity, wherein the opt-out response comprises an email or a webform containing natural language text indicating a response to the opt-out request; apply a second machine logic module to the opt-out response to classify, based on the natural language text indicating the response to the opt-out request, a type of the opt-out response as one of a plurality of types of opt-out responses; and display, via the user interface, a notification indicating the type of the opt-out response determined by the second machine logic module.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user device (e.g., a smartphone). In the alternative, the processor and the storage medium may reside as discrete components in a user device.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more items and may be used interchangeably with "at least one," "one or more," and the like. Also, as used herein, the terms "has," "have," "having," and the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more items and may be used interchangeably with "at least one," "one or more," and the like. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A method performed by a processing system of a user device, comprising:

scanning an email account of a user of the user device to identify a list of commercial email domains from which the email account has received one or more emails;

transmitting, via a communication interface of the user device, an opt-out request to a commercial email domain on the list of commercial email domains, wherein the opt-out request comprises an email composed by the processing system or a webform populated by the processing system requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof;

receiving, via the communication interface, an opt-out response from the commercial entity, wherein the opt-out response comprises an email or a webform containing natural language text indicating a response to the opt-out request;

applying a natural language processing (NLP) machine learning model to the opt-out response to classify, based on the natural language text indicating the response to the opt-out request, a type of the opt-out response as one of a plurality of types of opt-out responses, wherein the NLP machine learning model is retrained based on the opt-out response and the type of the opt-out response; and displaying, via a user interface of the user device, a notification indicating the type of the opt-out response determined by the NLP machine learning model.

2. The method of claim 1, wherein the plurality of types of opt-out responses comprises:

the opt-out request is complete, the personal information of the user has been deleted, the commercial entity will not share the personal information of the user, the commercial entity will not sell the personal information of the user, the personal information of the user was not found, more information is needed to complete the opt-out request, more steps are needed to complete the opt-out request, or any combination thereof.

3. The method of claim 1, wherein the notification indicating the type of the opt-out response comprises:

the opt-out request is complete, an indication that the personal information of the user was successfully deleted, an indication that the commercial entity will not share the personal information of the user, an indication that the commercial entity will not sell the personal information of the user, an indication that the personal information of the user was not found, an indication that additional information is needed to complete the opt-out request, or an indication that additional steps are needed to complete the opt-out request.

4. The method of claim 1, wherein the NLP machine learning model is trained on a plurality of human-classified full-text natural language opt-out responses from a plurality of commercial entities.

5. The method of claim 1, further comprising:
transmitting, to a server, via the communication interface, the opt-out response and the type of the opt-out response to enable the server to retrain the NLP machine learning model.

6. The method of claim 1, wherein:
the type of the opt-out response indicates that additional information is needed to complete the opt-out request,
the opt-out response includes an email address or a hyperlink to a webform for providing the additional information, and
the method further comprises:
populating the webform with the additional information; or
transmitting, via the communication interface, an email including the additional information to the email address.

7. The method of claim 1, further comprising:
receiving the NLP machine learning model from a server.

8. The method of claim 1, wherein applying the NLP machine learning model comprises:
transmitting, via the communication interface, the opt-out response to a server implementing the NLP machine learning model; and
receiving, via the communication interface, the type of the opt-out response from the server.

9. A method performed by a processing system of a user device, comprising:
scanning an email account of a user of the user device to identify a list of commercial email domains from which the email account has received one or more emails;
applying a natural language processing (NLP) machine learning model to the list of commercial email domains and user behavior profiles of the user associated with the list of commercial email domains to determine a subset of the list of commercial email domains to recommend for opt-out requests, wherein the NLP machine learning model is trained on a plurality of opt-out requests for a plurality of users for a plurality of commercial email domains and user behavior profiles for the plurality of users associated with the plurality of commercial email domains;
displaying, on a user interface of the user device, the subset of the list of commercial email domains;
receiving, via the user interface, a selection of a commercial email domain from the subset of the list of commercial email domains; and
transmitting, via a communication interface of the user device, an opt-out request to the commercial email domain, wherein the opt-out request comprises an email composed by the processing system or a webform populated by the processing system requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof.

10. The method of claim 9, wherein a user behavior profile of the user associated with the commercial email domain indicates:
whether any emails from the commercial email domain have been opened,
a number of emails from the commercial email domain that have been opened,
a number of emails from the commercial email domain that have not been opened,
a ratio of the number of emails from the commercial email domain that have been opened to the number of emails from the commercial email domain that have not been opened,
a date of a most recently opened email from the commercial email domain,
a date of a most recently received email from the commercial email domain,
a number of purchase confirmation emails from the commercial email domain,
a date of a most recent purchase confirmation email from the commercial email domain, or
any combination thereof.

11. The method of claim 9, wherein application of the NLP machine learning model to the list of commercial email domains and the user behavior profiles of the user associated with the list of commercial email domains further determines recommended types of opt-out requests to transmit to the subset of the list of commercial email domains.

12. The method of claim 11, wherein the recommended types of opt-out requests comprise:
requests to delete personal information of the user stored by commercial entities corresponding to the subset of the list of commercial email domains,
requests to refrain from sharing the personal information of the user with other entities,
requests to refrain from selling the personal information of the user with other entities, or
any combination thereof.

13. The method of claim 11, further comprising:
displaying, via the user interface, the recommended types of opt-out requests with the subset of the list of commercial email domains.

14. The method of claim 9, further comprising:
transmitting, to a server, via the communication interface, the opt-out request and a user behavior profile of the user associated with the commercial email domain to enable the server to retrain the NLP machine learning model.

15. The method of claim 9, wherein applying the NLP machine learning model comprises:
transmitting, to a server, via the communication interface, the list of commercial email domains and the user behavior profiles of the user associated with the list of commercial email domains; and
receiving, from the server, via the communication interface, the subset of the list of commercial email domains.

16. The method of claim 9, wherein the list of commercial email domains from which the email account has received one or more emails comprises:
all commercial email domains from which the email account has received one or more emails, or
only commercial email domains from which the email account has received one or more emails that are included in a database of commercial email domains.

17. The method of claim 9, further comprising:
receiving, via the communication interface, an opt-out response from the commercial entity, wherein the opt-out response comprises an email or a webform containing natural language text indicating a response to the opt-out request;
applying a machine learning model to the opt-out response to classify, based on the natural language text indicating the response to the opt-out request, a type of the opt-out response as one of a plurality of types of opt-out responses; and displaying, via the user interface, a notification indicating the type of the opt-out response determined by the machine learning model.

18. A method performed by a processing system of a user device, comprising:

scanning an email account of a user of the user device to identify a list of commercial email domains from which the email account has received one or more emails;

applying a machine logic module to the list of commercial email domains and user behavior profiles of the user associated with the list of commercial email domains to determine a subset of the list of commercial email domains to recommend for opt-out requests;

displaying, on a user interface of the user device, the subset of the list of commercial email domains;

receiving, via the user interface, a selection of a commercial email domain from the subset of the list of commercial email domains;

transmitting, via a communication interface of the user device, an opt-out request to the commercial email domain, wherein the opt-out request comprises an email composed by the processing system or a webform populated by the processing system requesting that a commercial entity corresponding to the commercial email domain delete personal information of the user stored by the commercial entity, refrain from sharing the personal information of the user with other entities, refrain from selling the personal information of the user with other entities, provide a copy of the personal information of the user that the commercial entity holds, or any combination thereof;

receiving, via the communication interface, an opt-out response from the commercial entity, wherein the opt-out response comprises an email or a webform containing natural language text indicating a response to the opt-out request;

applying a natural language processing (NLP) machine learning model to the opt-out response to classify, based on the natural language text indicating the response to the opt-out request, a type of the opt-out response as one of a plurality of types of opt-out responses, wherein the NLP machine learning model is retrained based on the opt-out response and the type of the opt-out response; and displaying, via the user interface, a notification indicating the type of the opt-out response determined by the NLP machine learning model.

\* \* \* \* \*